United States Patent
Monticello et al.

(10) Patent No.: US 11,582,982 B2
(45) Date of Patent: Feb. 21, 2023

(54) METHOD OF MAKING MONOACYLGLYCERIDE OILS AND FOOD PRODUCTS CONTAINING MONOACYLGLYCERIDE OILS

(71) Applicant: GlycosBio Inc., Houston, TX (US)

(72) Inventors: Daniel J. Monticello, The Woodlands, TX (US); Werner J. Bussman, Houston, TX (US)

(73) Assignee: GLYCOSBIO INC., Houston, TX (US)

( * ) Notice: Subject to any disclaimer, the term of this patent is extended or adjusted under 35 U.S.C. 154(b) by 434 days.

(21) Appl. No.: 16/746,700

(22) Filed: Jan. 17, 2020

(65) Prior Publication Data

US 2020/0146307 A1    May 14, 2020

Related U.S. Application Data

(63) Continuation-in-part of application No. PCT/US2018/055583, filed on Oct. 12, 2018.

(60) Provisional application No. 62/833,558, filed on Apr. 12, 2019, provisional application No. 62/794,412, filed on Jan. 18, 2019, provisional application No. 62/571,910, filed on Oct. 13, 2017.

(51) Int. Cl.
| | |
|---|---|
| A23D 7/01 | (2006.01) |
| A23L 33/15 | (2016.01) |
| A23L 29/00 | (2016.01) |
| A23D 7/015 | (2006.01) |

(52) U.S. Cl.
CPC ............. *A23D 7/011* (2013.01); *A23D 7/015* (2013.01); *A23L 29/06* (2016.08); *A23L 33/15* (2016.08)

(58) Field of Classification Search
CPC ......... A23D 7/011; A23D 7/015; A23L 29/06; A23L 33/15
USPC .......................................................... 426/611
See application file for complete search history.

(56) References Cited

U.S. PATENT DOCUMENTS

| | | |
|---|---|---|
| 2003/0054082 A1 | 3/2003 | Koike et al. |
| 2004/0062847 A1 | 4/2004 | Koike et al. |
| 2004/0209953 A1 * | 10/2004 | Wai Lee ............... A23L 33/12 514/547 |
| 2005/0129830 A1 | 6/2005 | Koike et al. |

FOREIGN PATENT DOCUMENTS

| | | | |
|---|---|---|---|
| EP | 2643445 A1 | 10/2013 | |
| WO | 2002011551 A1 | 2/2002 | |
| WO | WO-2013030816 A1 * | 3/2013 | ............... C12P 7/64 |
| WO | 2014099795 A1 | 6/2014 | |
| WO | 2015/069974 A1 | 5/2015 | |
| WO | 2015063041 A1 | 5/2015 | |

(Continued)

OTHER PUBLICATIONS

Rosu et al., Repeated Use of Immobilized Lipase for Monoacylglycerol Production by Solid-Phase Glycerolysis of Olive Oil, JAOCS, vol. 74, No. 4 (1997) (Year: 1997).*

(Continued)

*Primary Examiner* — Brent T O'Hern
(74) *Attorney, Agent, or Firm* — Barnes & Thornburg LLP; Matthew S. Gibson

(57) ABSTRACT

Compositions and methods are provided for incorporating processed oils with high monoacylglyceride (MAG) content into products and food products. Methods are specifically provided for generating high MAG content processed oils.

14 Claims, 13 Drawing Sheets

(56) References Cited

FOREIGN PATENT DOCUMENTS

| WO | 2016/066460 A1 | 5/2016 |
| WO | 201666460 A1 | 5/2016 |
| WO | 2017/019872 A1 | 2/2017 |
| WO | 2018206467 A1 | 11/2018 |
| WO | 2019075307 A1 | 4/2019 |

OTHER PUBLICATIONS

Jiang et al., Magnetic nanoparticles supported ionic liquids for lipase immobilization: Enzyme activity in catalyzing esterification, Journal of Molecular Catalysis B: Enzymatic 58 (2009) 103-109, (2008) (Year: 2008).*

International Search Report and Written Opinion dated Jan. 7, 2019 in Application No. PCT/US2018/55583.

Aparicio et al.: "Characterization of Monovarietal Virgin Olive Oils", Eur. J. Lipid Sci. Technol., v. 104, pp. 614-627, 2002.

Jiang et al.: "Magnetic nanoparticles supported ionic liquids for lipase immobilization: Enzyme activity in catalyzing esterification". Journal of Molecular Catalysis B: Enzymatic, v. 58, pp. 103-109, 2009.

Rosu et al.: "Repeated Use of Immobilized Lipase for Monoacylglycerol Production by Solid-Phase Glycerolysis of Olive Oil", JAOCS, v. 74(4), pp. 445-450, 1997.

Extended European Search Report dated Jun. 9, 2021, in European Application No. 18865493.3.

International Search Report dated Jul. 23, 2020, prepared in International Application No. PCT/US2020/014182.

English Translation of Office Action dated Aug. 2, 2022 by the Japanese Patent Office in Japanese Patent Application No. 2020-521346.

* cited by examiner

Typical Final Result

METHOD OF MAKING MONOACYLGLYCERIDE OILS AND FOOD PRODUCTS CONTAINING MONOACYLGLYCERIDE OILS

CROSS-REFERENCE TO RELATED APPLICATIONS

The present application is a continuation-in-part of PCT/US2018/055583, filed Oct. 12, 2018, which claims priority to U.S. Provisional Application No. 62/571,910, filed Oct. 13, 2017; and claims the benefit of U.S. Provisional Applications 62/794,412, filed Jan. 18, 2019; and 62/833,558 filed Apr. 12, 2019, the entirety of each of which are incorporated herein by reference in their entirety.

BACKGROUND

Chronic deficiency in the secretion of digestive enzymes by the pancreas is termed Exocrine Pancreatic Insufficiency (EPI). Without these digestive enzymes, patients suffering from EPI cannot properly digest nutrients in food and may suffer from malnutrition and abdominal disorders. EPI is prevalent in individuals with chronic pancreatitis and several other chronic gastrointestinal disorders. EPI also manifests in patients suffering from cystic fibrosis. The effects of EPI can be mitigated by Pancreatic Enzyme Replacement Therapy (PERT), in which the individual administers enzyme capsules each time food is consumed. Conventionally, PERT treatment comprises pancreatic enzymes extracted from porcine pancreas.

Lipids are energy-dense compounds that are the source of essential long chain fatty acids. Consumed lipids, typically comprising a high percentage of triacylglyceride (TAG) are digested with lipases secreted from the pancreas into free fatty acids (FFA) and monoacylglyceride (MAG). Blockage of lipase release from the pancreas results in very poor digestion of triacylglyceride-containing fats and oils. For patients suffering from EPI, this can lead to significant malnutrition because the calories, essential fatty acids and fat-soluble nutrients are trapped in the un-digested lipid particles and pass through the system.

There is an un-met clinical need for alternative sources of nutrition that can be consumed without needing to supplement with PERT by individuals with EPI.

Partially hydrolyzed fats and oils, in the form of MAGs are readily absorbed by individuals with EPI, without the requirement of PERT. MAG oil-based products have been evaluated in the clinic as capsule-based nutritional supplements; however, capsules were utilized to avoid the bad taste. For conventional sources of MAG oils, the starting oil is treated chemically or enzymatically to make MAGs, which are then extracted with solvents and distilled to fractionate the MAGs away from other components of the starting oils. These MAG products are sold as relatively pure products containing only negligible amounts of contaminating free fatty acid (FFA), diacylglycerides (DAGs) and TAGs, and with virtually no other compounds. Thus, conventional sources of MAG oil often lack the other natural compounds found in the oil, such as tocopherol.

There is clinical need for nutritional products with very-high-energy caloric density that can be consumed by individuals with inefficient or compromised digestive systems. In addition to individuals with pancreas pathologies (e.g., cystic fibrosis, pancreatitis and pancreatic cancer patients) other patients with diagnosed or undiagnosed Exocrine Pancreatic insufficiency (EPI) would benefit from the products. In addition, individuals with bile dysfunction (cholestasis) may benefit from "pre-digested" fats that do not require bile acids for emulsification. There are high calorie "energy bars" and drinks on the market. But, these products are not suitable for individuals who are unable to digest (hydrolyze) the fats in the product. Until now, no one has formulated lipids into liquid (shakes) and solid (bar) forms that are suitable for "PERT-free" use. These formulations can be a source of "Complete Nutrition", suppling all the caloric and essential fatty acid requirements of individuals. Liquid nutrition can be in the form of oral nutritional supplements (ONS) products of products for enteral feeding.

Accordingly, there is need for high caloric density foods that can be consumed by individuals with inefficient or compromised digestive systems. The present application describes a method to produce an edible enzyme-modified oil (EMO) that is substantially free of TAGs.

Monochloropropandiol (MCPD) and glycidyl esters are formed during the refining of edible oils. These compounds are toxic to humans and need to be minimized in food products. 3-MCPD is currently classified as a possible human carcinogen (group 2B) according to The International Agency for Research on Cancer (IARC). Glycidol is categorized as probably carcinogenic for humans (group 2A) by IARC and the US National Toxicology program. Current standards recommend exposure of less than 2 ug/kg body weight per day, which is less than 140 ug per day for a 70 kg man, and only 10 ug/day for a 5 kg (~10 lb) baby.

MCPD compounds were first detected in acid (HCl) hydrolyzed protein, but in 2008 the presence of MCPD esters in refined vegetable oils was discovered. It turned out the problem was widespread. Many edible oils are processed to remove components that negatively impact appearance, taste, shelf stability, safety and consumer acceptance. Mono- and di-acyl glycerols (MAGs and DAGs) in the oils can react with chlorine ions in the deodorization process to produce 3-Monochloropropanediol (3-MCPD) esters and glycidyl esters (GEs).

Table 1 below shows the levels of MCPD compounds in a sampling of edible oils in the United States (from *Food Additives & Contaminants: Part A,* 2013 Vol. 30, No. 12, 2081-2092).

| Refined Oil | mg/kg |
|---|---|
| Almond | 2.14 |
| Canola | 0.39 |
| Coconut | 0.97 |
| Corn | 0.85 |
| Cottonseed | 0.93 |
| Grape seed | 2.88 |
| Olive | 1.04 |
| Palm | 6.69 |
| Palm Kernel | 0.64 |
| Palm Olein | 10.17 |
| Palm Stearin | 6.82 |
| Peanut | 0.98 |
| Soybean | 0.36 |
| Sunflower | 0.94 |

The estimated US infant exposures to 3-MCPD and glycidyl esters consumption of infant formula was recently reported (J. Spungen et al. *Food Additives & Contaminants: Part T A* 2018, VOL. 35, NO. 6, 1085-1092). In this analysis, US FDA data on 3-MCPD and Glycidyl Ester concentrations (as 3-MCPD and glycidol equivalents, respectively) in a small convenience sample of infant formulas were used to estimate exposures from consumption of formula by infants 0-6 months of age. 3-MCPD and GE exposures based on mean concentrations in all formulas were estimated at 7-10 and 2 µg/kg bw/day, respectively. Estimated mean exposures from consumption of formulas produced by individual manufacturers ranged from 1 to 14 µg/kg bw/day for 3-MCPD and from 1 to 3 µg/kg for GE.

Accordingly, there is need for methods to reduce and eliminate these compounds in edible oils. The method of the present application to produce an edible enzyme-modified oil (EMO) that is substantially free of TAGs and contaminants such as MCPD and therefore addresses this need.

Some vegetable oils are rich in oleic acid. These oils have demonstrated health benefits. Some of this can be attributed to the oleic acid and oils that are rich in this fatty acid such as olive oil, almond oil and canola (rapeseed) oil. Triolein is a TAG that is very rich in oleic acid, as illustrated below. Triolein is 100% oleic acid esterified to glycerol at all three positions. The three positions are defined as "sn-1, sn-2 and sn-3". Sn is "stereo number."

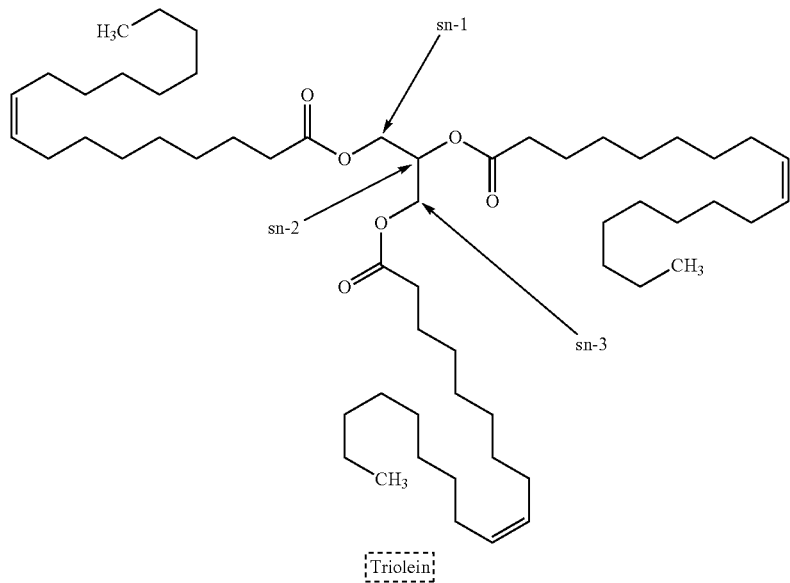 [SMILES: CCCCCCCC/C=C\CCCCCCCC(=O)OCC(COC(=O)CCCCCCC/C=C\CCCCCCCC)OC(=O)CCCCCCC/C=C\CCCCCCCC]

Given the health benefits of these oils, there is a need for compositions and methods that can provide the health benefits of these oils for individuals suffering from EPI, and to enhance and make the beneficial components of the oils more available.

SUMMARY

The present disclosure is directed to a product comprising a processed oil derived from an oil source. In one embodiment, the processed oil comprises a MAG content equal to or greater than 30% by weight of the total weight of the processed oil, a DAG content of from about 10% to about 30% by weight of the total weight of the processed oil, and a FFA content of from about 5% to about 60% by weight of the total weight of the processed oil, wherein the processed oil is either free of TAGs or comprises a TAG content that is equal to or less than about 5% by weight of the total weight of the processed oil, and wherein the processed oil comprises non-oil ingredients derived from and naturally present in the oil source such that the non-oil ingredients are not added to the processed oil.

In some embodiments, the oil source is from an origin selected from a plant, an animal, a fish, or mixtures thereof. In some embodiments, the oil source comprises MCPD compounds. In these embodiments, the processed oil is substantially free of MCPD compounds.

In some embodiments the non-oil ingredients of said product are selected from antioxidants, vitamins, and mixtures thereof.

In some embodiments, said product comprises greater than 1% by weight MAGs out of the total weight of the product.

In some embodiments, said product comprises greater than 50% by weight MAGs out of the total weight of the product.

The present disclosure is also directed to a food product. In one embodiment, the food product comprises an oil and having a caloric density of from about 1 kcal/gram to about 5 kcal/gram, wherein from about 20% to about 50% of calories are derived from said oil.

In some embodiments, the oil of said food product is a processed oil derived from an oil source, wherein the processed oil comprises a MAG content equal to or greater than 30% by weight of the total weight of the processed oil, a DAG content of from about 10% to about 30% by weight of the total weight of the processed oil, and a FFA content of from about 5% to about 60% by weight of the total weight of the processed oil wherein the processed oil is either free of TAGs or comprises a TAG content that is equal to or less than about 5% by weight of the total weight of the processed oil, and wherein the processed oil comprises non-oil ingredients derived from and naturally present in the oil source such that the non-oil ingredients are not added to the processed oil.

In some embodiments, the oil source of said food product is from an origin selected from a plant, an animal, or a fish.

In some embodiments, the non-oil ingredients of said food product are selected from antioxidants, vitamins, and mixtures thereof.

In some embodiments, said food product comprises greater than 1% by weight MAGs out of the total weight of the product.

In some embodiments, said food product comprises greater than 50% by weight MAGs out of the total weight of the product.

In some embodiments, said food product has a total weight from about 25 grams to about 3000 grams.

In some embodiments, said food product has a total calorie content from about 1 kcals to about 5 kcals per gram.

In some embodiments, said food product may further comprise a carbohydrate source.

In some embodiments, said food product may further comprise a protein source.

In some embodiments, said oil contributes from 5% to 95% of the total calorie content of the food product.

The present disclosure is also directed to a method for making a monoacylglycerol-enriched oil. In one embodiment, the method comprises mixing a starting oil comprising triacylglycerols (TAGs), a buffer solution and a first enzyme capable of hydrolyzing said TAGs to free fatty acids (FFAs) to yield a first reaction mixture; allowing said reaction mixture to react under conditions sufficient for said first enzyme to hydrolyze said TAGs for a first period of time to yield an aqueous phase and lipid (Free Fatty Acid) reaction product; inactivating said first enzyme in said reaction product; collecting said lipid reaction product; mixing said lipid reaction product and food-grade glycerol and a second enzyme capable of esterifying FFAs to form a second reaction mixture; allowing said second reaction mixture to react for a second period of time to yield a reaction product lipid oil phase and a glycerol phase; inactivating said second enzyme in said reaction product; adding salt to the reaction and separating the lipid oil phase from said glycerol phase; and collecting said lipid oil phase.

In some embodiments, said starting oil is an oil derived from plant, animal, marine, or mixtures thereof. In some embodiments, the starting oil comprises MCPD compounds and the lipid oil phase is substantially free of MCPD compounds.

In some embodiments, said first enzyme is lipase AY.

In some embodiments, said first period of time is a period of time sufficient to hydrolyze at least 94% of the TAGs in said starting oil.

In some embodiments, said first period of time is between about 14 hours and 24 hours.

In some embodiments, said step of allowing said reaction mixture to react under conditions sufficient for said first enzyme to hydrolyze said TAGs is performed at a temperature between about 30° C. and about 35° C.

In some embodiments, said steps of mixing a starting oil comprising triacylglycerols (TAGs), a buffer solution and a first enzyme capable of hydrolyzing said TAGs to free fatty acids (FFAs) and allowing said reaction mixture to react under conditions sufficient for said first enzyme to hydrolyze said TAGs to FFA are performed under a nitrogen atmosphere.

In some embodiments, said second enzyme is lipase G.

In some embodiments, said second period of time is a period of time sufficient to result in enrichment of MAGs in the lipid oil phase of about 60% to 95%.

In some embodiments, said second period of time is between about 24 hours and about 72 hours.

In some embodiments, said step of allowing said second reaction mixture to react for a second period of time to yield a lipid oil phase and a glycerol phase is performed at a temperature between about 17° C. and 23° C.

In some embodiments, the method further comprises drying said reaction product by applying a vacuum for a third period of time sufficient to remove at least a portion of water from the reaction product.

In some embodiments, said step of drying said reaction product is performed at a temperature between 20° C.-30° C.

In some embodiments, said drying step is applied throughout the second period of time.

In some embodiments, said step of inactivating said second enzyme is performed by heating said reaction product.

In some embodiments, said heating is performed at a temperature of at least 70° C. for at least 1 hour.

In some embodiments, said step of separating said lipid oil phase from said glycerol phase comprise adding sodium chloride to said reaction product.

In some embodiments, the final concentration of sodium chloride comprises up to 0.3 weight percent sodium chloride.

In some embodiments, the method further comprises before mixing said lipid reaction product and food-grade glycerol and a second enzyme capable of esterifying FFAs and glycerol, re-establishing a nitrogen atmosphere over said lipid reaction product.

In some embodiments, said steps of removing at least a portion of said aqueous phase and replacing said at least a portion of said aqueous phase with about an equivalent volume of water and waiting a second period of time are repeated before performing said step of collecting said lipid reaction product.

In some embodiments, the method further comprises adding tocopherol to said lipid oil phase after collecting said lipid oil phase.

In some embodiments, a processed oil having a total fatty acid content comprises oleic acid monoglyceride (MOG) in an amount that contributes between about 5% and about 75% by weight of the total fatty acid content of the processed oil composition.

In some embodiments, a processed oil comprises oleic acid and linoleic acid in a ratio of between about 0.01 and about 5, the processed oil having greater than 50% by weight monoacylglyceride (MAGs) based on the total weight of the processed oil.

In some embodiments, a processed oil comprises oleic acid and linolenic acid in a ratio between about 1 and about 100, the processed oil having greater than 50% by weight monoacylglyceride (MAGs) based on the total weight of the processed oil.

In some embodiments, a processed oil comprises oleic acid and linoleic acid and has a total fatty acid content, wherein the linoleic acid is present in an amount from about 10% to about 90% by weight out of the total fatty acid content of the processed oil.

In some embodiments, a processed oil has a fatty acid profile substantially the same as the fatty acid profile of the pre-processed oil from which the processed oil was produced.

In some embodiments, a processed oil has a fatty acid profile comprising oleic acid, linoleic acid and linolenic acid, wherein the amount of oleic acid, linoleic acid, and linolenic acid is within about 10% of the amount of oleic acid, linoleic acid and linolenic acid, respectively, in the pre-processed oil from which the processed oil was produced.

In some embodiments, a processed oil has a fatty acid profile comprising oleic acid, linoleic acid and linolenic acid, wherein the amount of oleic acid, linoleic acid, and linolenic acid is within about 1% of the amount of oleic acid, linoleic acid and linolenic acid, respectively, in the pre-processed oil from which the processed oil was produced.

In some embodiments a method for promoting glucose homeostasis in a subject in need thereof includes the step of administering to the subject a composition comprising a processed oil comprising oleic acid monoglyceride, wherein at least 50% by weight of said oleic acid monoglyceride is 1-oleyl monoglyceride.

In some embodiments a method for treating type II diabetes in a subject in need thereof includes the step of administering to the subject a composition comprising a processed oil comprising oleic acid monoglyceride, wherein at least 50% by weight of said oleic acid monoglyceride is 1-oleyl monoglyceride.

In some embodiments, a method for promoting glucose homeostasis in a subject in need thereof includes the step of administering to the subject a composition comprising a processed oil of the present disclosure.

In some embodiments, a method for treating diabetes in a subject in need thereof includes the step of administering to the subject a composition comprising a processed oil of the present disclosure.

BRIEF DESCRIPTION OF THE DRAWINGS AND FIGURES

DETAILED DESCRIPTION OF THE DISCLOSED SUBJECT MATTER

Figure 1:
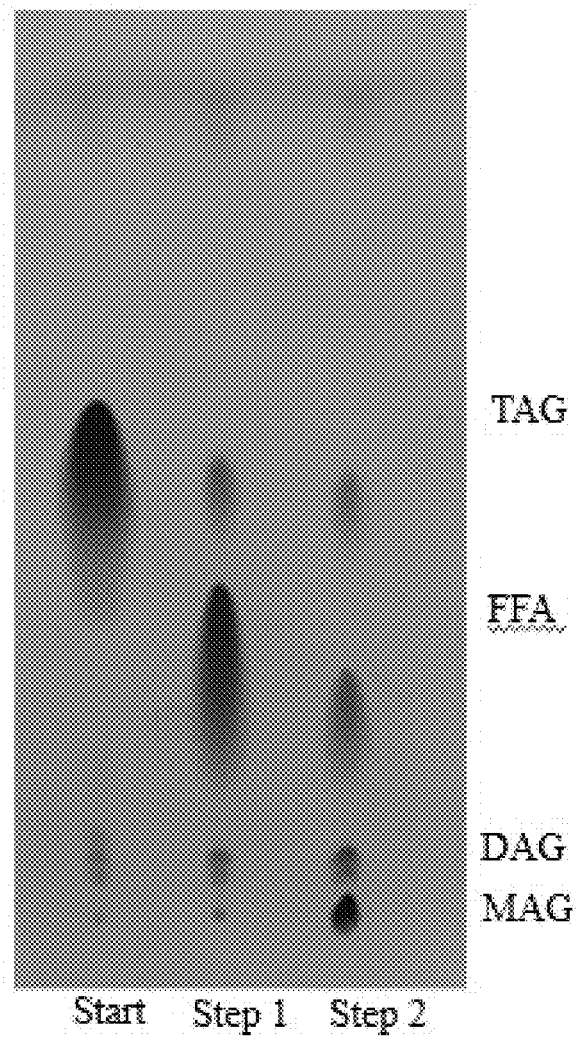
FIG. 1 depicts the TLC separation of components of starting vegetable oil, intermediate FFAs, and final MAG oil.

It is to be understood that both the foregoing general description and the following detailed description are exemplary and explanatory only, and are not restrictive of the invention, as claimed. In this application, the use of the singular includes the plural, the word "a" or "an" means "at least one", and the use of "or" means "and/or", unless specifically stated otherwise. Furthermore, the use of the term "including", as well as other forms, such as "includes" and "included", is not limiting. Also, terms such as "element" or "component" encompass both elements or components comprising one unit and elements or components that comprise more than one unit unless specifically stated otherwise.

The section headings used herein are for organizational purposes only and are not to be construed as limiting the subject matter described. All documents, or portions of documents, cited in this application, including, but not limited to, patents, patent applications, articles, books, and treatises, are hereby expressly incorporated herein by reference in their entirety for any purpose. In the event that one or more of the incorporated literature and similar materials defines a term in a manner that contradicts the definition of that term in this application, this application controls.

"Enriched" in the context of this invention means with an amount higher than in the starting material. For example, a MAG-enriched oil is an oil having a MAG content that is greater than the starting MAG content prior to the enrichment process or that the starting oil has a greater percentage of MAG than the oil possessed prior to the enrichment process. The enrichment process can be by conversion of TAGs to MAGs thereby increasing the MAG content and percentage and decreasing the TAG content or percentage.

A triacylglycerol ("TAG"), also known as a triglyceride, is a glyceride consisting of three fatty acid chains covalently bonded to a glycerol molecule through ester linkages. TAGs may also be classified as having a long or medium chain length. Long chain TAGs contain fatty acids with 14 or more carbons, while medium chain TAGs contain fatty acids with 6 to 12 carbons. Long chain TAGs can include omega-3 and omega-6 fatty acids. Medium chain TAGs have saturated fatty acids and thus do not contain omega-3 or omega-6 fatty acids. Long chain TAGs (LCT) and medium chain triglycerides (MCT) can serve as energy sources.

A diacylglycerol ("DAG"), also known as a diglyceride, is a glyceride consisting of two fatty acid chains covalently bonded to a glycerol molecule through ester linkages.

A monoacylglycerol ("MAG"), also known as a monoglyceride, is a glyceride consisting of one fatty acid chain covalently bonded to a glycerol molecule through an ester linkage As used herein, the term "processed oil" refers to a non-naturally occurring oil composition substantially free TAGs or having a reduced amount of TAGs with respect to the pre-modified or pre-processed oil.

As used herein, the terms "enzyme-modified oil" or "EMO" refers to a processed oil wherein TAGs were enzymatically converted to MAGs, such as, for example, using the enzymatic conversion of the present disclosure.

As used herein, the term "food product" refers to a manufactured or non-naturally occurring food product. It should be understood that the food product referred to herein, while manufactured and non-naturally occurring as a whole, can comprise various combinations of natural ingredients where said combinations either do not occur in nature or where said combinations do exist in nature, they do not exist in the relative amounts used in the food product.

The terms "patient," "individual," and "subject" are used interchangeably herein, and refer to a mammalian subject to be treated, with human patients being preferred. In some cases, the methods of the invention find use in experimental animals, in veterinary application, and in the development of animal models for disease, including, but not limited to, rodents including mice, rats, and hamsters, and primates.

"Treatment" is an intervention performed with the intention of preventing the development or altering the pathology or symptoms of a disorder. Accordingly, "treatment" can refer to both therapeutic treatment and prophylactic or preventative measures. Those in need of treatment include those already with the disorder as well as those in which the disorder is to be prevented. In tumor (e.g., cancer) treatment, a therapeutic agent may directly decrease the pathology of tumor cells, or render the tumor cells more susceptible to treatment by other therapeutic agents, e.g., radiation and/or chemotherapy.

As used herein, a "non-oil ingredient" is an ingredient that is naturally present in an oil source that is not a MAG, DAG, TAG, FFA or lipid.

In some embodiments, the starting oils may comprise, by way of example but not limitation, oils derived from plants such as olive oil, almond oil, canola oil, coconut oil, cottonseed oil, palm kernel oil, palm olein oil, palm stearin oil, peanut oil, flaxseed oil, sunflower seed oil, corn oil, grapeseed oil, palm oil, soybean oil, or oil derived from animals such as fish oil, sardine oil, or anchovy oil, or algal oil, or mixtures of any of the foregoing plant oils and/or animal oils. In one aspect, the starting oil comprises a blend of olive oil, sunflower seed oil, and flaxseed oil, wherein the from about 50% to about 80% by weight of the total weight of the starting oil is olive oil, from about 10% to about 30% by weight of the total weight of the starting oil is sunflower seed oil, and from about 5% to about 20% by weight of the total weight of the starting oil is flaxseed oil. In another aspect, from about 50% to about 80% by weight of the total weight of the starting oil is olive oil, from about 10% to about 30% by weight of the total weight of the starting oil is flaxseed oil, and from about 5% to about 20% by weight of the total weight of the starting oil is sunflower seed oil.

In some embodiments, the starting oils comprise MCPD compounds. The MCPD compounds may be in an amount from about 0.30 mg/kg to about 12.0 mg/kg, or from about 1.0 mg/kg to about 11.00 mg/kg, or from about 2.00 mg/kg to about 10.50 mg/kg. Examples of starting oils comprising MCPD compounds includes almond, canola, coconut, corn, cottonseed, grape seed, olive, palm, palm kernel, palm olein, palm stearin, peanut, soybean, and sunflower.

In some embodiments, the process of making a product enriched in MAGs comprises a first step of hydrolyzing TAGs. By way of example but not limitation, the hydrolysis of TAGs may be carried out by a lipase such as lipase AY (Amano Enzymes, USA Elgin Ill., USA), or any non-regiospecific lipase that cuts at the sn-1, sn-2 and sn-3 positions.

In some embodiments, the first step of hydrolyzing TAGs may be carried out at a temperature of about 30° C. to 35° C. By way of example but not limitation, the first step of hydrolyzing TAGs may be carried out at a temperature of 30° C. to 35° C., 31° C. to 35° C., 32° C. to 35° C., 33° C. to 35° C., 34° C. to 35° C., 30° C. to 34° C., 31° C. to 34° C., 32° C. to 34° C., 33° C. to 34° C., 30° C. to 33° C., 31° C. to 33° C., 32° C. to 33° C., 30° C. to 32° C., 31° C. to 32° C., 30° C. to 31° C., or 30° C., 31° C., 32° C., 33° C., 34° C., or 35° C.

In some embodiments, the first step of hydrolyzing TAGs may be carried out for about 14 hours to 24 hours. By way of example but not limitation, the first step of hydrolyzing TAGs may be carried out for 14 hours to 20 hours, 14 hours to 16 hours, 18 hours to 24 hours, 22 hours to 24 hours, 18 hours to 20 hours, or about 14 hours, 15 hours, 16 hours, 17 hours, 18 hours, 19 hours, 20 hours, 21 hours, 22 hours, 23 hours, or 24 hours.

In some embodiments, the first step of hydrolyzing TAGs results in hydrolysis of substantially all TAG. By way of example but not limitation, the first step of hydrolyzing TAGs results in hydrolysis of 94% to 100%, 95% to 100%, 96% to 100%, 97% to 100%, 98% to 100%, 99% to 100%, 94% to 99%, 95% to 99%, 96% to 99%, 97% to 99%, 98% to 99%, 94% to 98%, 95% to 98%, 96% to 98%, 97% to 98%, 94% to 97%, 95% to 97%, 96% to 97%, 94% to 96%, 95% to 96%, or 94% to 95% TAG, or at least 94%, 95%, 96%, 97%, 98%, 99%, or 100% of TAG.

In some embodiments the process of making a product enriched in MAGs comprises a second step of esterification with glycerol to enrich MAG oil content. By way of example but not limitation, this second step of esterification may be carried out by a lipase such as lipase G, (Amano Enzymes, USA Elgin Ill., USA), or any regiospecific lipase that catalyzes esterification at the sn-1 position but does not effectively catalyze formation of the second or third ester on glycerol (to make DAGs and TAGs).

In some embodiments the second step of esterification with glycerol to enrich MAG oil content results in enrichment of MAGs in the product by about 70% to 95%. By way of example but not limitation, the MAG oil content may be enriched by 70% to 95%, 75% to 95%, 80% to 95%, 85% to 95%, 90% to 95%, 70% to 90%, 75% to 90%, 80% to 90%, 85% to 90%, 70% to 85%, 75% to 85%, 80% to 85%, 70% to 80%, 75% to 80%, 70% to 75%, or 70%, 75%, 80%, 85%, 90%, or 95%.

In some embodiments, the second step of esterification with glycerol may be carried out at a temperature of about 17° C. to 23° C. By way of example but not limitation, the esterification with glycerol may be carried out at a temperature of 17° C. to 23° C., 18° C. to 23° C., 19° C. to 23° C., 20° C. to 23° C., 21° C. to 23° C., 22° C. to 23° C., 17° C. to 22° C., 18° C. to 22° C., 19° C. to 22° C., 20° C. to 22° C., 21° C. to 22° C., 17° C. to 21° C., 18° C. to 21° C., 19° C. to 21° C., 20° C. to 21° C., 17° C. to 20° C., 18° C. to 20° C., 19° C. to 20° C., 17° C. to 19° C., 18° C. to 19° C., 17° C. to 18° C., or 17° C., 18° C., 19° C., 20° C., 21° C., 22° C., or 23° C.

In some embodiments, the second step of esterification with glycerol may be carried out for about 24 hours to 72 hours. By way of example but not limitation, the second step of esterification with glycerol may be carried out for 24 hours to 72 hours, 36 hours to 72 hours, 48 hours to 72 hours, 60 hours to 72 hours, 24 hours to 60 hours, 36 hours to 60 hours, 48 hours to 60 hours, 24 hours to 48 hours, 36 hours to 48 hours, 24 hours to 36 hours, or 24 hours, 30 hours, 36 hours, 42 hours, 48 hours, 54 hours, 60 hours, 66 hours, or 72 hours.

In some embodiments, the process of making a product enriched in MAGs comprises a third step of lipase inactivation and phase separation.

The resulting product from the above embodiments results in a processed oil having a MAG content of equal to or greater than 40% by weight based on the total weight of the processed oil. In certain aspects, the MAG content is from about 40% to about 99% by weight based on the total weight of the processed oil. In certain aspects, the MAG content is from about 50% to about 99% by weight based on the total weight of the processed oil. In certain aspects, the MAG content is from about 60% to about 99% by weight based on the total weight of the processed oil. In certain aspects, the MAG content is from about 70% to about 99% by weight based on the total weight of the processed oil. In certain aspects, the MAG content is from about 80% to about 99% by weight based on the total weight of the processed oil. In certain aspects, the MAG content is from about 50% to about 80% by weight based on the total weight of the processed oil. In any of the above aspects, the TAG content is equal to or less than 5% by weight based on the total weight of the processed oil. In any of the above aspects, the TAG content is equal to or less than 4%, equal to or less than 3%, equal to or less than 2%, equal to or less than 1% by weight based on the total weight of the processed oil.

The resulting product from the above embodiments results in a processed oil that is substantially free of MCPD compounds generally, but also when the starting oils have more than 0.30 mg/kg MCPD compounds and in some instances from about 1.0 mg/kg to about 12.00 mg/kg. More specifically, the processed oil resulting from the above methods comprises less than 100 mg/kg MCPD and even to levels that are not detectable by standard assays. As used herein, the term "substantially free" with respect to the amount of MCPD levels in a processed oil of the present invention means levels that are below the limits of detection for the assay described in Example 11 below.

The resulting product from the above embodiments results in a processed oil that is enriched in MAGs, specifically 1-MAGs (MAGs esterified at the sn-1 position). In the case of processed oils made from starting oils having oleic acid content, this results in the production of 1-oleyl monoacylglyceride (1-OG). It has been found that manufacturing process embodiments of the present disclosure can efficiently convert even sn-2 oleic acid TAGs to 1-OG. For example, starting with triolein, the manufacturing process embodiments of the present disclosure can yield three 1-OG molecules from a single triolein molecule, while digestion of triolein by pancreatic lipases can only yield one-third of the total oleic acid in monoacylglycerol form, specifically as 2-monoacylglycerol (2-OG) but not 1-OG, because the lipase liberates the oleic acid moieties at the sn-1 and sn-3 positions as free fatty acids. Thus, a processed oil produced by the manufacturing methods of the present disclosure can yield up to three times the 1-OG content compared to normal digestion processes. The below reaction schematic shows the conversion of triolein to 2-OG and two free oleic acid molecules (process A—normal digestion) and of triolein to 3 molecules of 1-OG by the process of the present disclosure (process B).

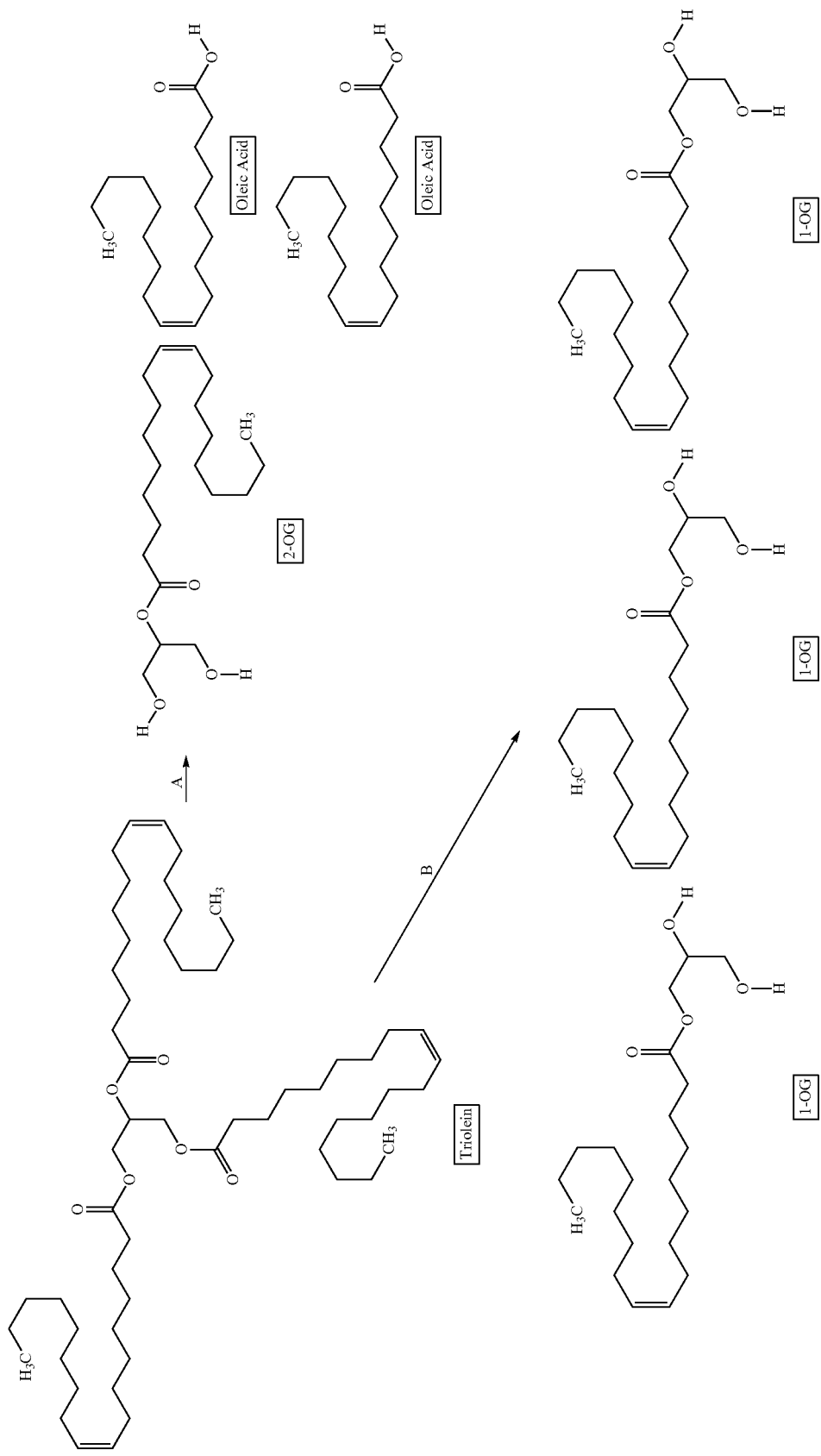

It has also been found that the manufacturing process embodiments of the present disclosure can preserve the fatty acid profile of the starting oil in the processed oil. Representative fatty acid profiles for various starting oils are shown in Table 2 below which provides percentages of total fatty acid methyl esters (FAMEs). Nd—not determined. SAF—safflower, GRP—grape, SIL—*Silynum marianum*, HMP—hemp, SFL—sunflower, WHG—wheat germ, PMS—pumpkin seed, SES—sesame, RB—rice bran, ALM—almond, RPS—rapeseed (canola), PNT—peanut, OL—olive, and COC—coconut oils. Table 2 also provides the ratios of oleic acid/linoleic acid and oleic acid/linolenic acid for each oil.

20% to 40%, 30% to 40%, 5% to 30%, 10% to 30%, 20% to 30%, 5% to 20%, 10% to 20%, 5% to 10%, or about 5%, 10%, 15%, 20%, 25%, 30%, 35%, 40%, 45%, 50%, 55%, 60%, or 66% by weight of the total weight of the processed oil.

In some embodiments, including the above embodiments regarding the MAG and/or DAG content, the processed oil comprises a FFA content equal to or greater than 5% by weight of the total weight of the processed oil. By way of example but not limitation, the processed oil comprises a FFA content of about 5% to 66%, 10% to 66%, 20% to 66%, 30% to 66%, 40% to 66%, 50 to 66%, 5% to 50%, 10% to 50%, 20% to 50%, 30% to 50%, 40% to 50%, 5% to 40%, Edible Oils

| FAs [%] | SAF | GRP | SIL | HMP | SFL | WHG | PMS | SES | RB | ALM | RPS | PNT | OL | COC |
|---|---|---|---|---|---|---|---|---|---|---|---|---|---|---|
| C6:0 | nd | nd | nd | nd | nd | nd | nd | nd | nd | nd | nd | nd | nd | 0.52 |
| C8:0 | nd | 0.01 | nd | nd | nd | nd | nd | nd | nd | nd | nd | nd | nd | 7.6 |
| C10:0 | nd | nd | nd | nd | nd | nd | nd | nd | nd | nd | 0.01 | nd | nd | 5.5 |
| C12:0 | nd | 0.01 | 0.01 | nd | 0.02 | 0.07 | nd | nd | nd | 0.09 | nd | nd | nd | 47.7 |
| C14:0 | 0.1 | 0.05 | 0.09 | 0.07 | 0.09 | nd | 0.17 | nd | 0.39 | 0.07 | nd | 0.04 | nd | 19.9 |
| C15:0 | nd | 0.01 | 0.02 | nd | nd | 0.04 | nd | nd | nd | nd | 0.02 | nd | nd | nd |
| C16:0 | 6.7 | 6.6 | 7.9 | 6.4 | 6.2 | 17.4 | 13.1 | 9.7 | 20 | 6.8 | 4.6 | 7.5 | 16.5 | nd |
| C17:0 | 0.04 | 0.06 | 0.06 | 0.05 | 0.02 | 0.03 | 0.13 | nd | nd | 0.05 | 0.04 | 0.07 | nd | nd |
| C18:0 | 2.4 | 3.5 | 4.5 | 2.6 | 2.8 | 0.7 | 5.7 | 6.5 | 2.1 | 2.3 | 1.7 | 2.1 | 2.3 | 2.7 |
| C20:0 | nd | 0.16 | 2.6 | nd | 0.21 | nd | 0.47 | 0.63 | nd | 0.09 | nd | 1.01 | 0.43 | nd |
| C22:0 | nd | nd | nd | nd | nd | nd | nd | 0.14 | nd | nd | nd | nd | 0.15 | nd |
| C16:1 (n-7) | 0.08 | 0.08 | 0.05 | 0.11 | 0.12 | 0.21 | 0.12 | 0.11 | 0.19 | 0.63 | 0.21 | 0.07 | 1.8 | nd |
| C17:1 (n-7) | nd | nd | 0.03 | nd | nd | nd | nd | nd | nd | nd | nd | nd | nd | nd |
| C18:1cis (n-9) Oleic | 11.5 | 14.3 | 20.4 | 11.5 | 28 | 12.7 | 24.9 | 41.5 | 42.7 | 67.2 | 63.3 | 71.1 | 66.4 | 6.2 |
| C18:1trans (n-9) | nd | nd | nd | nd | nd | nd | nd | nd | nd | nd | 0.14 | nd | nd | nd |
| C20:1(n-9) | nd | 0.4 | 0.15 | 16.5 | 0.18 | 7.91 | 1.08 | 0.32 | 1.11 | 0.16 | 9.1 | nd | 0.3 | nd |
| C18:2cis (n-6) Linoleic | 79 | 74.7 | 63.3 | 59.4 | 62.2 | 59.7 | 54.2 | 40.9 | 33.1 | 22.8 | 19.6 | 18.2 | 16.4 | 1.6 |
| C18:3 (n-3) Linolenic | 0.15 | 0.15 | 0.88 | 0.36 | 0.16 | 1.2 | 0.12 | 0.21 | 0.45 | nd | 1.2 | nd | 1.6 | nd |
| Oleic/Linoleic Ratio | 0.15 | 0.19 | 0.32 | 0.19 | 0.45 | 0.21 | 0.46 | 1.01 | 1.29 | 2.95 | 3.23 | 3.91 | 4.05 | 3.88 |
| Oleic/Linolenic Ratio | 76.7 | 95.3 | 23.2 | 31.9 | 175.0 | 10.6 | 207.5 | 197.6 | 94.9 | nd | 52.8 | nd | 41.5 | nd |

In particular, linoleic (omega-6 fatty acid) and linolenic acid (omega-3 fatty acid) are known to be essential for humans as they can be used in the creation of longer and more desaturated fatty acids otherwise known as long-chain polyunsaturated fatty acids (LC-PUFA), including eicosapentaenoic acid (EPA) and docosahexanenoic acid (DHA).

In some embodiments, a product comprises a processed oil of the present disclosure. In some embodiments, the processed oil is itself a stand-alone product.

In some embodiments, the processed oil comprises a MAG content equal to or greater than 30% by weight of the total weight of the processed oil. By way of example but not limitation, the processed oil comprises a MAG content of about 30% to 95%, 40% to 95%, 50% to 95%, 60% to 95%, 70% to 95%, 80% to 95%, 90% to 95%, 30% to 90%, 40% to 90%, 50% to 90%, 60% to 90%, 70% to 90%, 80% to 90%, 30% to 80%, 40% to 80%, 50% to 80%, 60% to 80%, 70% to 80%, 30% to 70%, 40% to 70%, 50% to 70%, 60% to 70%, 30% to 60%, 40% to 60%, 50% to 60%, 30% to 50%, 40% to 50%, or about 30%, 35%, 40%, 45%, 50%, 55%, 60%, 65%, 70%, 75%, 80%, 85%, 90%, or 95% by weight of the total weight of the processed oil.

In some embodiments, including the above embodiments regarding the MAG content, the processed oil comprises a DAG content equal to or greater than 5% by weight of the total weight of the processed oil. By way of example but not limitation, the processed oil comprises a DAG content of about 5% to 66%, 10% to 66%, 20% to 66%, 30% to 66%, 40% to 66%, 50 to 66%, 5% to 50%, 10% to 50%, 20% to 50%, 30% to 50%, 40% to 50%, 5% to 40%, 10% to 40%, 10% to 40%, 20% to 40%, 30% to 40%, 5% to 30%, 10% to 30%, 20% to 30%, 5% to 20%, 10% to 20%, 5% to 15%, 10% to 15%, 5% to 10%, or about 5%, 10%, 15%, 20%, 25%, 30%, 35%, 40%, 45%, 50%, 55%, 60%, or 66% by weight of the total weight of the processed oil.

In some embodiments, including the above embodiments regarding the MAG, DAG and/or FFA content, the processed oil is either free of TAGs or comprises a TAG content that is equal to or less than 5% by weight of the total weight of the processed oil. By way of example but not limitation, the processed oil comprises a TAG content that is about 0% to 5%, 1% to 5%, 2% to 5%, 3% to 5%, 4% to 5%, 0% to 4%, 1% to 4%, 2% to 4%, 3% to 4%, 0% to 3%, 1% to 3%, 2% to 3%, 0% to 2%, 1% to 2%, 0% to 1%, or 0%, 1%, 2%, 3%, 4% or 5% by weight of the total weight of the processed oil. By way of further example but not limitation, the TAG content can be less than 5%, 4%, 3%, 2%, 1%, 0.5%, or 0.1%.

In some embodiments, the processed oil comprises from about 30% to 80% MAG by weight of the total weight of the processed oil, from about 10% to about 30% DAG by weight of the total weight of the processed oil, from about 0% to about 5% TAG by weight of the total weigh of the processed oil, and from about 5% to about 60% FFA by weight of the total weight of the processed oil.

In any of the embodiments herein, the processed oil comprises non-oil ingredients derived from and naturally present in the oil source such that the non-oil ingredients are not added to the processed oil. By way of example but not limitation, such non-oil ingredients may include antioxidants such as tocopherols, which include alpha-tocopherol, beta-tocopherol, delta-tocopherol, gamma-tocopherol, alpha-tocotrienol, beta-tocotrienol, delta-tocotrienol, or gamma-tocotrienol, and other vitamins such as Vitamin K and structurally similar 2-methyl-1,4-naphthoquinone (3-) derivatives. In some embodiments, the antioxidant is selected from natural (e.g., mixed tocopherols or ascorbic acid) and synthetic (e.g, Butylated HydroxyAnisole or Butylated HydroxyToluene) antioxidants. Further examples of non-oil ingredients include ceramide phosphates, monogalactosyl diacyglycerols, phosphatidyl methanol, sitosteryl esters, campesterol esters, sphingolipids, phosphatidyl glycerol, wax esters, and sphingomyelin.

In any of the embodiments herein, the processed oil comprises oleic acid monoglyceride (MOG) and has a total fatty acid content. The MOG can contribute between about 5% and about 75% by weight of the total fatty acid content of the processed oil. In some embodiments, by way of example, but not limitation, the MOG can contribute between about 10% and about 75%, about 20% and about 75%, about 30% and about 75%, about 40% and about 75%, about 50% and about 75%, or about 60% and about 75% by weight of the total fatty acid content of the processed oil. In some embodiments, the processed oil comprises oleic acid in amount of about 5% and about 75% by weight of the total fatty acid content of the processed oil. In some embodiments, by way of example, but not limitation, the oleic acid can contribute between about 10% and about 75%, about 20% and about 75%, about 30% and about 75%, about 40% and about 75%, about 50% and about 75%, or about 60% and about 75% by weight of the total fatty acid content of the processed oil.

In any of the embodiments herein, the processed oil comprises MOG and the MOG comprises at least 50% by weight 1-oleyl monoglyceride (1-OG) out of the total amount of MOG. By way of example, but not. limitation, the processed oil can comprise at least 50%, at least 60%, at least 70%, at least 80%, at least 85%, at least 90%, at least 95%, or at least 99% 1-OG out of the total amount of MOG.

In any of the embodiments herein, the processed oil comprises oleic acid in an amount of about 10% to about 75% by weight out of the total fatty acid content of the processed oil. By way of example, but not limitation, the oleic acid can be present in an amount of about 10% to about 75%, about 20% to about 75%, about 30% to about 75%, about 40% to about 75%, about 50% to about 75%, about 60% to about 75%, about 10% to about 20%, about 10% to about 30%, about 10% to about 40%, about 10% to about 50%, or about 10% to about 60% by weight out of the total fatty acid content of the processed oil. In any of the embodiments herein, the oleic acid is esterified at the sn-1 position. By way of example, but not limitation, the processed oil can comprise at least 50%, at least 60%, at least 70%, at least 80%, at least 85%, at least 90%, at least 95%, or at least 99% of oleic acid esterified at the sn-1 position out of the total amount of oleic acid.

In any of the embodiments herein, the processed oil comprises linoleic acid in an amount of about 1.5% to about 90% by weight out of the total fatty acid content of the processed oil. By way of example, but not limitation, the linoleic acid can be present in an amount of about 10% to about 90%, about 20% to about 90%, about 30% to about 90%, about 40% to about 90%, about 50% to about 90%, about 60% to about 90%, about 70% to about 90%, about 80% to about 90%, about 10% to about 25%, about 10% to about 20% by weight out of the total fatty acid content of the processed oil. In some embodiments, the processed oil comprises oleic acid and linoleic acid with a ratio of oleic acid to linoleic acid between about 0.01 and 5. By way of example, but not limitation, the ratio of oleic acid to linoleic acid can be between about 1 to about 5, about 1 to about 4, about 1 to about 3, about 1 to about 2, about 1.5 to about 5, about 1.5 to about 4, about 1.5 to about 3, about 1.5 to about 2, about 2 to about 5, about 2 to about 4, about 2 to about 3, about 2.5 to about 5, about 2.5 to about 4.5, about 2.5 to about 4, about 2.5 to about 3.5, about 2.5 to about 3, about 3 to about 5, or about 3 to about 4.

In any of the embodiments herein, the processed oil comprises linolenic acid in an amount of about 0.01% to about 2% by weight out of the total fatty acid content of the processed oil. By way of example, but not limitation, the linolenic acid can be present in an amount of about 0.1 to about 2%, about 0.5 to about 2%, about 1% to about 2%, or about 1.5% to about 2% by weight out of the total fatty acid content of the processed oil. In some embodiments, the processed oil comprises oleic acid and linolenic acid with a ratio of oleic acid to linolenic acid of about 1 to about 100. By way of example, but not limitation, the ratio of oleic acid to linolenic acid can be between about 10 and about 100, about 20 and about 100, about 30 and about 100, about 40 and about 100, about 50 and about 100, about 60 and about 100, about 70 to about 100, about 10 to about 90, about 10 to about 80, about 10 to about 70, about 10 to about 60, about 10 to about 50, about 10 to about 40, about 10 to about 30, or about 10 to about 20. It should be understood that reference to fatty acids in the claims should not be understood as limited to the free fatty acid only, and can refer to the fatty acid in glyceride form. In processed oils of the present disclosure, the fatty acid will predominantly be in the MAG form and in the pre-processed oil it will, be predominantly in the TAG form. In certain instances, the fatty acid to a lesser extent can be in the free or DAG form. In the processed oil, the free fatty acid will typically be less than 10%.

In any of the embodiments herein, the processed oil has a fatty acid profile that is substantially the same as the fatty acid profile of the pre-processed oil from which the processed oil was produced. By way of example, but not limitation, the fatty acid profile of the processed oil can be within about 10%, about 9%, about 8%, about 7%, about 6%, about 5%, about 4%, about 3%, about 2%, or about 1% for each component of the fatty acid profile. In some embodiments, the fatty acid profile comprises oleic acid, linoleic acid and linoleic acid. However, any combination of fatty acids may form the fatty acid profile. By way of example, but not limitation, the fatty acid profile can comprise any combination of fatty acids listed in Table 2 as well as EPA and DHA.

In any of the embodiments herein, the processed oil comprises three times the amount of MAG molecules compared to the number of TAG molecules in the pre-processed oil from which the oil was produced. For example, on a molar basis, the amount oleic acid in the form of MAGs in the processed oil can be up to three times the amount, of oleic acid in TAGs in the pre-processed oil. By way of example, but not limitation, the amount of oleic acid in the form of MAG in the processed oil can be 1.1, 1.25, 1.5, 1.75, 2.0, 2.25, 2.5, 2.75 or 3 times the amount of oleic acid in the form of TAGs in the pre-processed oil. For example, each oleic acid moiety in the form of TAGs in the pre-processed oil can be converted to an oleic acid MAG, such that up to three oleic acid moieties, as in triolein, would be converted into three oleic acid MAGs. In some embodiments, the amount of MAGs in the processed oil is three times the amount of TAGs in the pre-processed oil from which the processed oil was produced. For example, the number of MAGs produced corresponds to about three times the number of TAGs in the pre-processed oil. In some embodiments, the processed oil comprises oleic acid in the oleic acid monoglyceride form in an amount that is about the same as the amount of oleic acid in the pre-processed oil from which the processed oil was produced.

In some embodiments the product or food product can comprise at least 1% MAGs. By way of example, but not limitation, the food product can comprise at least 1%, 2%, 3%, 4%, 5%, 6%, 7%, 8%, 9%, 10%, 11%, 12%, 13%, 14%, 15%, 20%, 25%, 30%, 35%, 40%, 45%, 50% or more MAGs by weight of the product or food product and any range or amount therebetween. By way of further example, but not limitation, the product or food product can comprise between 5% to 15% weight MAGs by total weight of the product or food product.

In some embodiments, the product or food product can comprise at least 3% of the processed oil of any of the embodiments herein by weight of the total weight of the product or food product. By way of example, but not limitation, the food product can comprise at least 3%, 4%, 5%, 6%, 7%, 8%, 9%, 10%, 11%, 12%, 13%, 14%, 15%, 16%, 17%, 18%, 19%, 20%, 25%, 30%, 35%, 40%, 45%, 50%, 55%, 60%, 65%, 70% or more of the processed oil of any of the embodiments herein by weight of the product or food product and any range or amount therebetween.

In some embodiments, the food product may further comprise a carbohydrate source. By way of example but not limitation, such a carbohydrate source may comprise simple sugars such as glucose and fructose, derived from carbohydrate sources such as fruit and agave syrups. Other carbohydrate sources include other plant-based sugar syrups, starches, and sugar alcohols.

In some embodiments, the food product may further comprise a protein source. In certain aspects, the protein source can be hydrolyzed or partially hydrolyzed. By way of example but not limitation, such a protein source may comprise dairy protein (casein and whey), and other plant proteins including protein from soy, rice and rice bran, lentils, chickpeas, peanuts, almonds, *spirulina* (algal), *quinoa*, mycoprotein, chia seeds and hemp seeds. The hydrolyzed protein may be extensively hydrolyzed wherein the pea protein is enriched in peptides of 1 to 10 amino acids in length. In some embodiments, the protein is enriched in peptides of 1 to 10 amino acids in length by about 25% to 75% compared to commercial partially hydrolyzed protein and other whey-based hydrolysate products such as Peptamen and Crucial. By way of example but not limitation, the protein is enriched in peptides of 1 to 10 amino acids in length by at least 25% to 75%, 35% to 75%, 45% to 75%, 55% to 75%, 65% to 75%, 25% to 65%, 35% to 65%, 45% to 65%, 55% to 65%, 25% to 55%, 35% to 55%, 45% to 55%, 25% to 45%, 35% to 45%, 25% to 35%, or 25%, 30%, 35%, 40%, 45%, 50%, 55%, 60%, 65%, 70%, or 75%.

In some embodiments, the food product can be a liquid, semi-solid or solid. By way of example but not limitation, a semi-solid can include a pudding, mousse, popsicle or ice cream-like product. By way of example but not limitation, a liquid could be a shake or other beverage. By way of example but not limitation, a solid could be a bar or other solid food product.

In some embodiments, the product or food product further comprises a viscosity altering agent. The viscosity altering agent can be, by way of example but not limitation, xanthan gum or gum acacia. In some embodiments, the product or food product can further comprise a structure or stability enhancing component such as, by way of example but limitation, gum Arabic, sunflower lecithin and xanthan gum. In some embodiments, the product or food product further comprises a fiber source, such as, by way of example but limitation, oligosaccharides. In some embodiments the product or food product can further comprise a food preservative such as, by way of example, but not limitation sodium benzoate or potassium sorbate.

In some embodiments, a product or food product further comprises a flavor, masker or blocker. By way of example, but not limitation, flavorings can include chocolate, vanilla, strawberry or other flavors.

In some embodiments, the food product has a total weight of at least 25 grams. By way of example, but not limitation, the food product can have a weight of at least 25, 50, 100, 250, 500, 1000, 1500, 2000, 2500, 3000 grams or more. In some embodiments, the food product has a total weight from about 25 grams to about 3000 grams. By way of example but not limitation, the food product may have a weight from 25 grams to 3000 grams, 25 grams to 2500 grams, 25 grams to 2000 grams, 25 to 1000 grams, 25 grams to 500 grams, 50 grams to 3000 grams, 50 grams to 2500 grams, 50 grams to 2000 grams, 50 grams to 1500 grams, 50 grams to 1000 grams, 50 grams to 500 grams, 100 grams to 3000 grams, 100 grams to 2500 grams, 100 grams to 2000 grams, 100 grams to 1500 grams, 100 grams to 1000 grams, 100 grams to 500 grams, 250 grams to 3000 grams, 250 grams to 2500 grams, 250 grams to 2000 grams, 250 grams to 1500 grams, 250 grams to 1000 grams, 250 grams to 500 grams, 500 grams to 3000 grams, 500 grams to 2500 grams, 500 grams to 2000 grams, 500 grams to 1500 grams, 500 grams to 1000 grams, 1000 grams to 3000 grams, 1000 grams to 2500 grams, 1000 grams to 2000 grams, 1000 grams to 1500 grams, 1500 grams to 3000 grams, 1500 grams to 3000 grams, 2000 grams to 3000 grams, 2000 grams to 2500 grams, 25 grams to 250 grams, 50 grams to 250 grams, 100 grams to 250 grams, 25 grams to 100 grams, 50 grams to 100 grams, 25 grams to 50 grams, or a total weight that is less than or equal to 25 grams, 50 grams, 100 grams, 150 grams, 200 grams, 250 grams, 300 grams, 350 grams, 400 grams, 450 grams, 500 grams, 1000 grams, 1500 grams, 2000 grams, 2500 grams, or 3000 grams.

In some embodiments, the food product has a total calorie content from about 200 kcals to 1000 kcals. By way of example but not limitation, the food product may have a calorie content from about 200 kcals to 1000 kcals, 400 kcals to 1000 kcals, 600 kcals to 1000 kcals, 800 kcals to 1000 kcals, 200 kcals to 800 kcals, 400 kcals to 800 kcals, 600 kcals to 800 kcals, 200 kcals to 600 kcals, 400 kcals to 600 kcals, 200 kcals to 400 kcals, or an amount less than or equal to 200 kcals, 300 kcals, 400 kcals, 500 kcals, 600 kcals, 700 kcals, 800 kcals, 900 kcals, or 1000 kcals.

In some embodiments, about 20% to 75% of calories in the food product are derived from an oil or fat. In one aspect, the oil or fat is the processed oil of any of the embodiments herein. In yet another aspect, the processed oil has a MAG content of equal to or greater than 30% by weight of the total weight of the processed oil. In other aspects, the processed oil has a MAG content of from about 40% to about 99% by weight of the total weight of the processed oil. In yet another aspect, the processed oil has a TAG content of less than 5% by weight of the total weight of the processed oil. By way of example but not limitation, 20% to 50%, 30% to 50%, 40% to 50%, 20% to 40%, 30% to 40%, 20% to 30%, 20% to 75%, 30% to 75%, 40% to 75%, 50% to 75%, 60% to 75%, 70% to 75%, 20% to 70%, 30% to 70%, 40% to 70%, 50% to 70%, 60% to 70%, 20% to 60%, 30% to 60%, 40% to 60%, 50% to 60%, or about 20%, 21%, 22%, 23%, 24%, 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74%, or 75%, of calories in the food product are derived from any of the above described processed oils.

In any of the above embodiments regarding the food product, about 20% to 50% of calories in the food product are derived from the carbohydrate source. By way of example but not limitation, 20% to 50%, 30% to 50%, 40% to 50%, 20% to 40%, 30% to 40%, 20% to 30%, or about 20%, 21%, 22%, 23%, 24%, 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49%, or 50% of calories in the food product are derived from the carbohydrate source.

In any of the above embodiments regarding the food product, about 10% to 50% of calories in the food product are derived from the protein source. By way of example but not limitation, 10% to 50%, 20% to 50%, 30% to 50%, 40% to 50%, 10% to 40%, 20% to 40%, 30% to 40%, 10% to 30%, 20% to 30%, 10% to 20%, or about 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49%, or 50% of calories in the food product are derived from the protein source.

It should be understood that the above disclosed embodiments of the food product can be combined.

In some embodiments, a food product of the present disclosure comprises a processed oil of the present disclosure.

In some embodiments, the EMO-based products are consumed by individuals with poorly functioning digestive systems, by way of example but not limitation, individuals suffering from EPI or individuals who take PERT with food. In some embodiments, the EMO-based products are consumed by individuals who desire faster or more complete conversion of lipids to serum triglycerides. Thus, a method for feeding a human or animal subject with a poorly functioning digestive system is provided. The method comprises administering to said patient a food product described in any of the above embodiments or combinations of such embodiments. In one aspect, the human or animal subject is suffering from EPI. In other aspects, the human or animal subject is suffering from cystic fibrosis, pancreatitis, pancreatic cancer, or cholestasis.

In some embodiments, a method is provided for promoting glucose homeostasis in a subject in need thereof, comprising administering to the subject a composition comprising a processed oil of the present disclosure. In some embodiments, the subject is suffering from a condition that affects glucose homeostasis. In some embodiments, the condition is insulin resistance or diabetes mellitus. In some embodiments, the condition is type II diabetes.

In some embodiments, a method is provided for treating diabetes in a subject in need thereof, comprising administering to the subject a composition comprising a processed oil of the present disclosure. In some embodiments, the diabetes is type II diabetes.

EXAMPLES

Example 1: Process of Making a Product Enriched in MAG Compared to Starting TAG-Rich Oil The method of making a product enriched in MAG compared to the starting TAG-rich oil involves 3 key steps: (1) A mild enzymatically-catalyzed reaction to hydrolyze triglycerides (TAGs) in a sequence that converts the natural oils to specific combinations of FFAs, MAGs, DAGs, and low residual TAGs; (2) an esterification with glycerol to generate predominantly high amounts of MAGs leaving low concentrations of FFAs; and (3) isolation of the modified lipid product; this is achieved by phase separation with or without the aid of a centrifuge.

Step 1. Enzymatic Conversion of Triacylglycerols

Preparation of the buffer solution. A sodium citrate solution (100 mM, pH 5.8) was prepared in a stirred tank reactor. 11.1 L of deionized (DI) water was placed in the mixing vessel, the agitator was set to 200 RPM and 0.213 kg of citric acid (anhydrous) were added. After the powder was dissolved the pH was adjusted with sodium hydroxide solution to pH=5.8 (about 0.121 kg). 220 mL was removed for subsequent enzyme preparation.

Preparation of the enzyme solution. In a separate 250 mL bottle, the enzyme solution was prepared under gentle stirring: 200 mL of the citrate buffer solution was placed in the mixing vessel. 10 g of AMANO Lipase AY was added and the bottle was shaken until the enzyme is dissolved.

Conversion of Triglyceride Oil Mixture. Three vegetable oils, Olive Oil, Flaxseed Oil and Sunflower seed Oil were added to the vessel to give a total of 10 kg of plant oil mixture. Vacuum was applied to drop the pressure to about 20 mmHg and degas the material (from any dissolved oxygen in particular). Agitation was set to 200 RPM and the mixture was heated to 33° C. and agitated for about 15 Min to remove any dissolved gas. The vacuum was then replaced by a Nitrogen gas atmosphere. Once the mixture was sufficiently dispersed, 220 mL of the enzyme preparation in buffer solution was added. Agitation was continued and the reaction monitored for 24 hours until conversion to FFA was complete based on TLC analysis.

Reactor temperature was increased to 70° C. and agitation resumed for 1 hour to inactivate the enzyme.

Agitation was stopped and the phases separated in about 60 Minutes.

The aqueous (lower) phase was removed along with a small amount of the oil phase to ensure residual protein at the interface was eliminated.

Step 2. Esterification with Glycerol. Typically when FFA are re-esterified with glycerol they produce a mixture of MAGs, DAGs and TAGs. We found that by significantly reducing the temperature (below 25° C.) and removing the water (by evaporation) as it is formed in the reaction, that the proportion of MAGs in the product can be highly enriched (at least 60% but as high as 95%). This was un-expected.

In the reaction, the reaction product from step 1 (about 10 L) was cooled to about 30° C. and agitated at 300 RPM. 10 kg of Food-grade glycerol were added to the Lipid mixture, and the temperature maintained at ~30° C. The mixture was agitated to generate a dispersion of the oil and glycerol. To dry the reaction mixture a vacuum was applied: First a vacuum (25 mmHg, Torr) was applied with receiver in place to collect water. Once evaporation of the residual water had stopped, 20 g of Amano Lipase G dissolved in water (50 mL) was added to the reactor. The temperature was lowered to 23° C. and the vacuum was changed to 5 mmHg using an oil diaphragm pump and a cold trap to collect the water. The mixture was stirred at 300 RPM at 23° C. under vacuum for 72 hrs, at which time the vacuum was broken and the mixture was blanketed with nitrogen gas. The mixture was analyzed after 72 hrs with TLC to evaluate the conversion to MAGs as shown in FIG. 1.

Step 3. Lipase Inactivation and Phase Separation. After the reaction was complete, the lipase was inactivated by heating the mixture (under a Nitrogen gas blanket) to 70° C. for 1 hr. At this point the MAG oil and glycerol are well mixed and very hard to separate through traditional gravity or centrifugal methods. After considerable experimentation, we found that the lipid can be separated from the excess glycerol by adding 0.3% wt of salt (NaCl) to the reaction mixture under agitation. The product mixture was then allowed to cool to about 60° C. and left without agitation for about 1 hr.

The lipid oil phase separated from the remaining heavier glycerol phase. The glycerol phase was removed: it contains some salt, residual water and the dissolved inactivated enzyme which is contained in the visible interface. The glycerol phase can be reused after membrane filtration and should be kept for recycle. Tocopherol (Vitamin E) was added to give a concentration of 200 ppm (0.02% wt) of the product oil. The hydrolyzed oil (about 10 kg was ready for use and could be stored under nitrogen blanket).

Product Storage. The final hydrolyzed products were transferred to food-grade containers with an overlay of nitrogen gas for storage and transportation.

Example 2: Characterization of Oil Produced in Example 1

Reaction products and the overall process can be evaluated using Thin Layer Chromatography and Gas Chromatography.

Thin-Layer Chromatography Testing. Components of the oil samples were separated using TLC plates (Analtech Uniplate Silica Gel GHL with inorganic binder, 20×20 cm, 250 μm). The solvent was Hexane:Diethyl Ether:Acetic Acid (70:30:1) solution. Typical sample sizes were 3 μL. After the solvent front ran to near the top of the plate (~1 cm), plates were removed from the TLC tank and the solvent evaporated in a fume hood. The components were visualized with iodine vapors (at room temperature) in a TLC tank and relative intensities estimated by colorimetric imaging (Amersham 600 Imager). After 15 minutes in the tank, plates were removed and photographed. The intensity of the spots diminished after 30-60 minutes.

Physical properties determination was performed to establish product consistency, color, water content, fats & oils (miscible).

Figure 2:
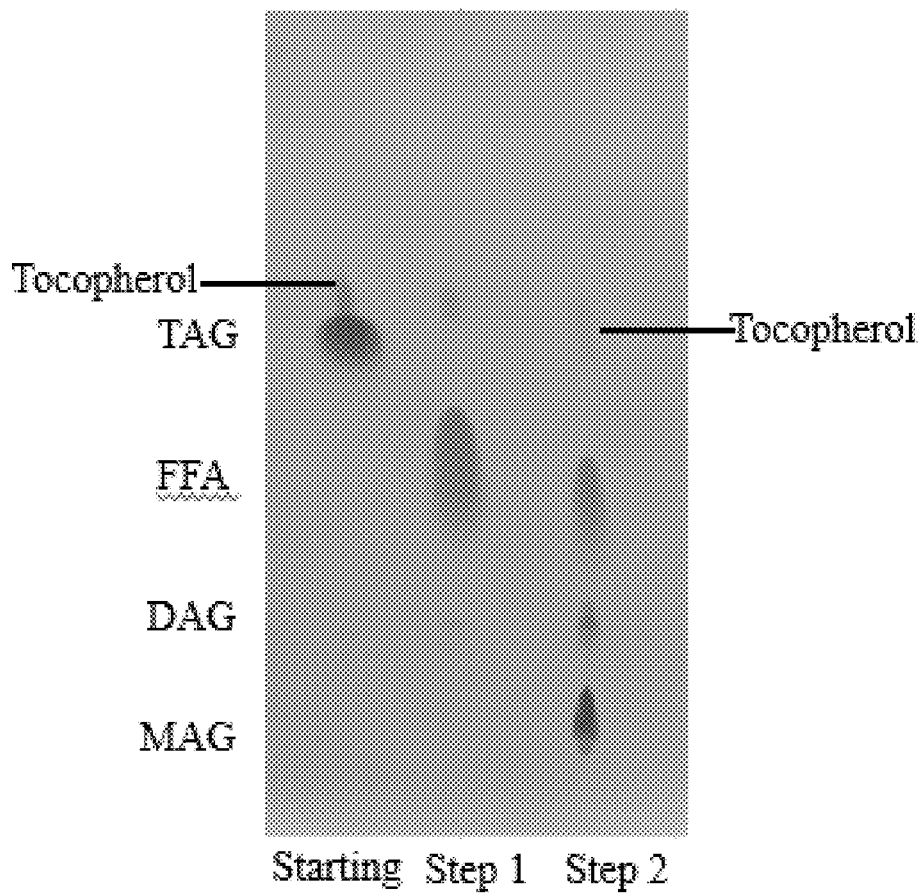
FIG. 2 depicts the TLC separation of components of starting vegetable oil, intermediate FFAs, and final MAG oil.

FIG. 1 depicts the final results of steps 1 to 3 in the process of making a product enriched in MAG compared to starting TAG-rich oil as describe in Example 1. FIG. 2 illustrates that tocopherol initially present in the olive oil is preserved following the steps described in Example 1. In FIG. 2, the tocopherol spot can be seen tracking above the TAG spot in all three lanes.

Fatty Acid Profile Testing—Gas Chromatography. Lipid components including C10:0 Capric Acid, C12:0 Laurie Acid, C14:0 Myristic Acid, C16:0 Palmitic Acid, C18:0 Stearic Acid, C18:1 Oleic Acid, C18:2 Linoleic Acid, and C18:3 Alpha Linolenic Acid were analyzed after derivatization as the fatty acid methyl esters and compared to standards. For the derivatization, a sample (500 μl) was added to a 5-ml reaction tube containing 2 ml boron trifluoride solution (12% in methanol), 20 μl dimethoxypropane and 100 μl of a tridecanoic acid internal standard solution (10 mg/ml). The reaction tube was vortexed and incubated in a heating block at 60° C. for 30 minutes.

The reaction tube was removed from the heating block and allowed to cool for 15 minutes. Then, 1 ml of distilled water was added to quench the reaction, followed by 1 ml of hexane. The reaction tube was vortexed for 60 seconds and the phases were allowed to separate for 3 minutes. The top (hydrophobic) phase was removed to a 1.5-ml tube containing about 50 mg sodium sulfate (anhydrous). After vortexing for 60 seconds, the 1.5-ml tube was centrifuged and ~500 μl of the clarified, dried hydrophobic phase was transferred to a gas chromatography sample vial.

Samples were analyzed using an Agilent 7890A gas chromatograph with Flame ionization detector and Agilent Openlab CDS Chemstation software. GC Column: Omegawax 100 (15 m×0.1 mm×0.1 um) column. Results were converted to weight % by internal standard reference.

Figure 3:
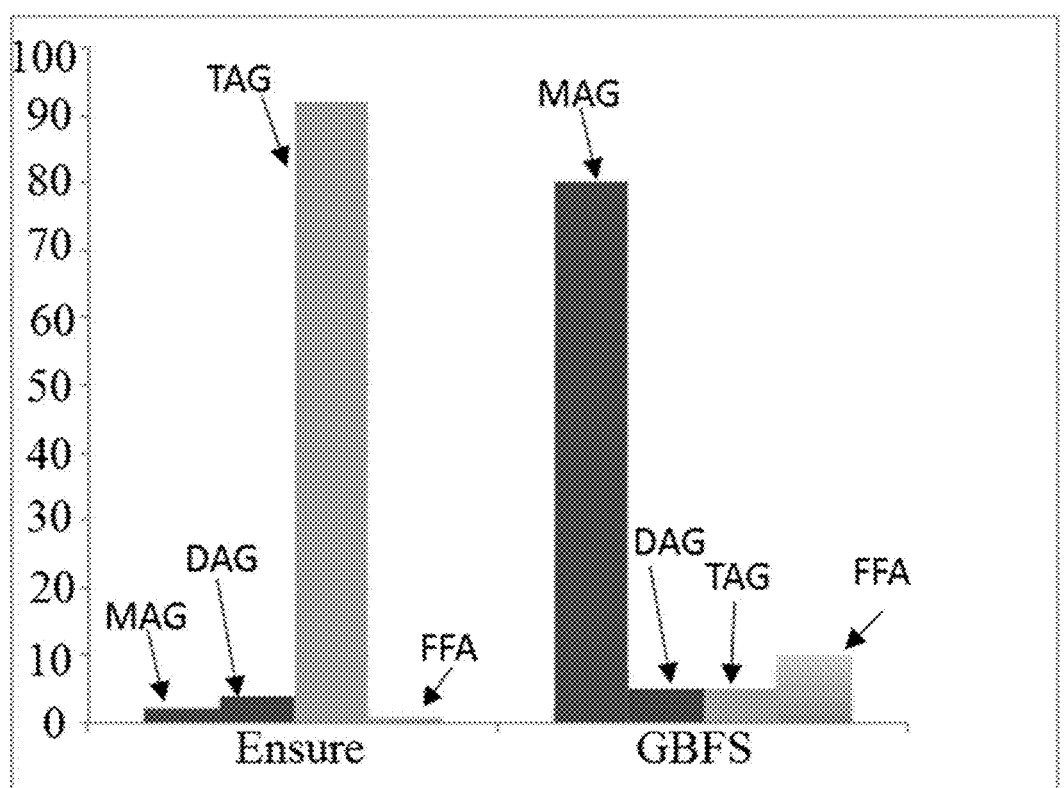
FIG. 3 depicts the distribution of FFA, MAG, DAG, and TAG in "Ensure Original Nutritional Shake" and Enzyme Modified Oil product of the present disclosure ("GBFS").

FIG. 3 depicts the distribution of FFA, MAG, DAG, and TAG in Ensure and a GBFS product of the present disclosure. Percent FFA, MAG, DAG and TAG in the oils determined by Thin Layer Chromatography.

Figure 4:
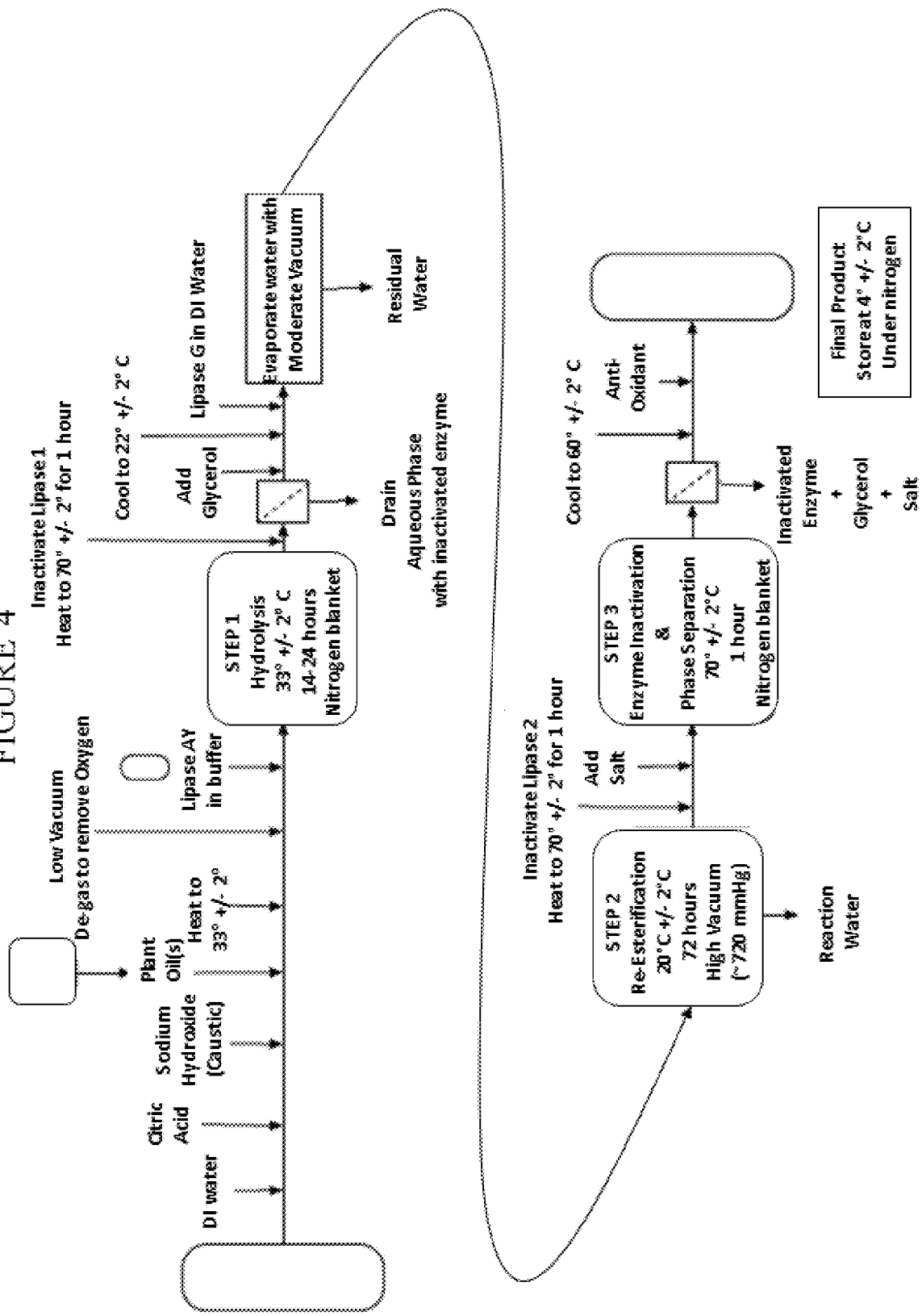
FIG. 4 depicts a block flow diagram of the process of manufacturing enzyme modified oil.

Example 3: Another Example of the Process of Making a Product Enriched in MAG Compared to Starting TAG-Rich Oil The following procedure is depicted by block flow diagram in FIG. 4.

Plant oil was added to citric acid and sodium hydroxide (caustic) in DI water and heated to 33° C.+/−2° C. A low vacuum was applied to de-gas to remove oxygen. Lipase AY was added. Hydrolysis of the mixture was performed for 14-24 hours under a Nitrogen blanket at a temperature of 33° C.+/−2° C.

Lipase was inactivated at a temperature of 70° C.+/−2° C. for 1 hour. The aqueous phase with inactivated enzyme was drained. Glycerol was added. Then the reaction was cooled to 22° C.+/−2° C. Then Lipase G was added and water was evaporated under a moderate vacuum.

Re-esterification was carried out for 72 hours under high vacuum (around 720 mmHg) at a temperature of 20° C.+/−2° C. Lipase G was inactivated at 70° C.+/−2° C. for one hour and salt was added to the reaction.

Enzyme inactivation and phase separation was carried out under a Nitrogen blanket for 1 hour at 70° C.+/−2° C. The aqueous phase with inactivated enzyme, glycerol, and salt was drained. The reaction was cooled to 60° C.+/−2° C. Antioxidant was added. The final product was stored at 4° C.+/−2° C. under nitrogen.

Example 4: Ready-to-Drink Formulation Incorporating MAGs and Hydrolyzed Protein

A product of the present disclosure was produced as a conventional "milk shake" formulation that includes a source of fats, proteins, carbohydrates, vitamins and fiber in addition to the traditional surfactants and stabilizing agents typically found in these products. An individual serving was 250 ml. The ingredients as would appear on the ingredient label were as follows: Water, Organic Agave Syrup, Hydrolyzed Pea Protein, Hydrolyzed Oil Blend, Gum Arabic, Sunflower Lecithin, Xanthan Gum, Oligosaccharides, Potassium Sorbate, Sodium Benzoate, Instant Coffee, Natural Organic Vanilla Flavor, Vitamin C, Vitamin E Succinate, Vitamin A Palmitate, Niacinamide, D-Calcium Pantothinate, Pyrodoxine HCl, Thiamine HCl, Riboflavin, Vitamin D3, Folic Acid, Cyanocobalamin, Vitamin K2.

Carbohydrates were supplied as simple sugars (glucose and fructose) from fruit and agave syrups.

Protein in the product was partially hydrolyzed pea protein (PURIS Pea Protein 870H, World Food Processing LLC, Turtle Lake, Wis. 54889).

We also produced extensively hydrolyzed pea protein (EHP) with peptides in a size range more bio-available for transport across the intestinal wall. EHP was produced by further enzyme hydrolysis. For example, partially hydrolyzed pea protein (Puris Pea Protein 870H described above) protein was dissolved in 100 mM Phosphate buffer to a concentration of 25 mg/ml. Enzyme was added and the reaction incubated at 500 overnight. Three different commercial GRAS enzymes were evaluated: Alcalase, Thermoase and flavourzyme.

The average size and distribution of peptides in the protein samples were evaluated using size exclusion chromatography. Samples were dissolved in 100 mM phosphate buffer, pH 6.8 to a concentration of 25 mg/ml and analyzed on a Shimadzu HPLC with UV detector (214 nm) using a Phenomenex Yarra 3 um SEC-2000 column (Eluted with 100 mM sodium Phosphate buffer (pH 6.8), Flow rate of 0.8 mL/min at room temperature). Samples were compared to a molecular weight standard (Phenomenex SEC standard part ALO-3042). Sizes were estimated using a calibration curve generated from known molecular weight standards. The average size of un-hydrolyzed pea protein was ~200 amino acids. The average size of the Puris Pea 870H partially hydrolyzed material was 34 amino acids, with a substantial amount in the 2-40 amino acid range, similar to other (whey-based) protein hydrolysate products.

Figure 5:
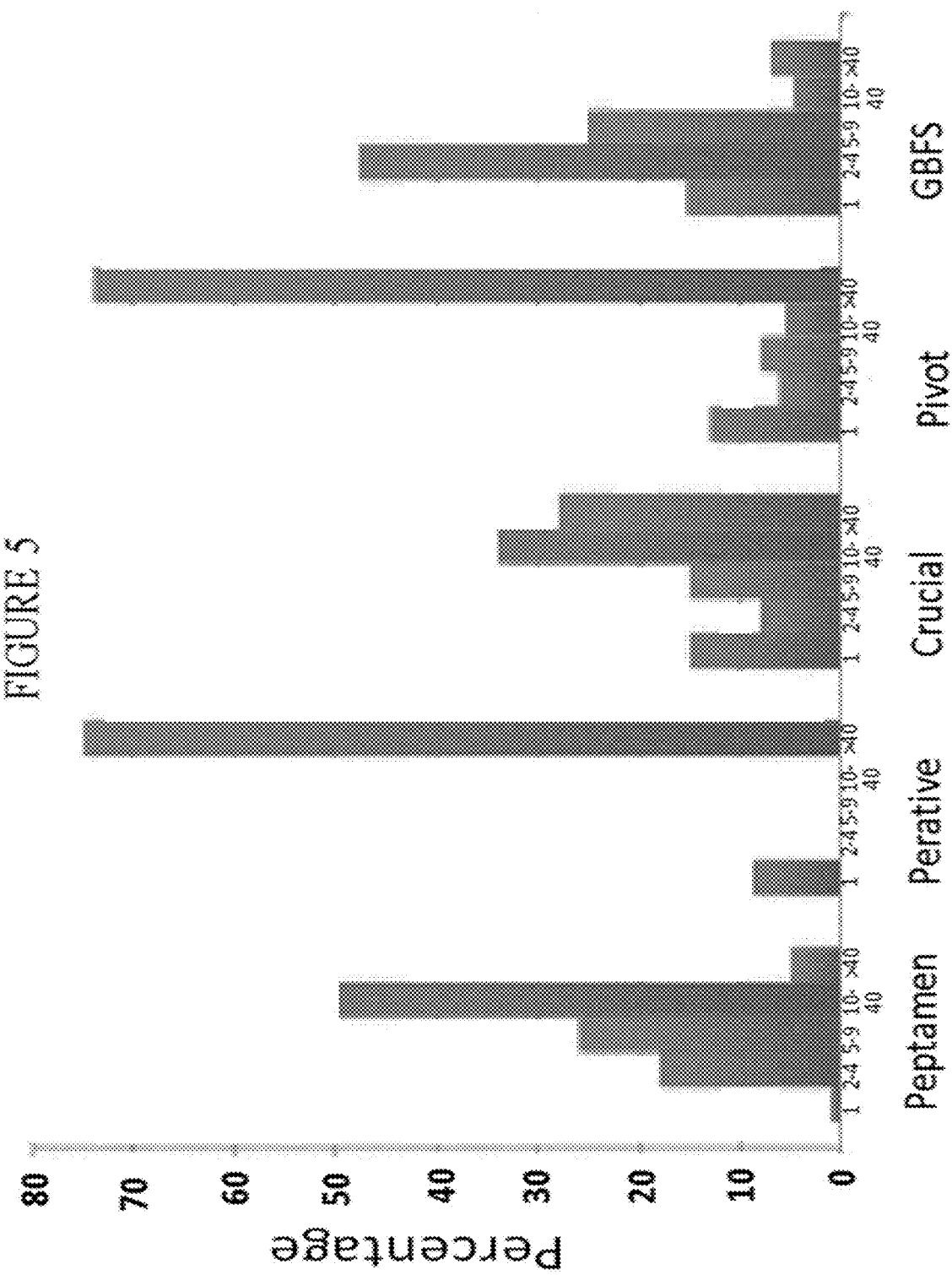
FIG. 5 depicts the distribution of amino acids and peptides in ready-to-drink nutritional drinks and GBFS hydrolyzed pea protein.

FIG. 5 depicts the distribution of amino acids and peptides in ready-to-drink nutritional drinks as reported in E. Phillips et al., 2005 Peptide-Based Formulas: the Nutraceuticals of Enteral Feeding? EPCN October:40-45 compared to the GBFS extensively hydrolyzed pea protein described above. FIG. 5 depicts the percentage of amino acids (Y-Axis) of the size 1 amino acid, 2-4 amino acids, 9-10 amino acids, 10-40 amino acids, or greater than 40 amino acids in the products Peptamen, Perative, Crucial, Pivot, and the GBFS of the present disclosure (X-Axis). The average size of the GBFS EHP is 3-4 amino acids, mostly 1-7 amino acids.

Fat is provided in the form of the re-structured Lipid MAG and were produced from a blend of olive oil (70%), sunflower oil (21%) and flaxseed oil (9%) to provide the energy and other benefits of poly-unsaturated fatty acids (PUFA), omega-6 PUFA and omega-3 PUFA. The Omega-6/omega-3 ratio is ~4/1.

Gum Arabic, sunflower lecithin, and xanthan gum are common GRAS food ingredients used to provides structure and stability for the drink. Oligosaccharides provide non-digestable fiber. Potassium Sorbate and Sodium Benzoate are common food preservatives. Instant coffee and Vanilla provide flavor.

A vitamin package including fat soluble and water-soluble vitamins was included.

A prototype Product Nutritional label is shown in Table 3. In Table 3, ** Percentage Daily Values (% DV) are based on a 2,000 calorie diet, † Daily Value (DV) not established.

| Supplement Facts Serving Size 250 ml | | | |
|---|---|---|---|
| | Amount Per Serving | | % DV ** |
| Calories | 379 | kcal | |
| Total Fat | 19 | g | 24% |
| Cholesterol | — | mg | 0% |
| Total Carbohydrate | 32 | g | 12% |
| Dietary Fiber | 2 | g | 7% |
| Sugars | 30 | g | |
| Protein | 20 | g | 40% |
| Vitamin A | 320 | mcg | 35% |
| Vitamin C | 480 | mg | 35% |
| Vitamin D | 7 | mcg | 35% |
| Vitamin E | 5 | mg | 35% |
| Vitamin K | 42 | mcg | 35% |
| Thiamine | 400 | mcg | 35% |
| Riboflavin | 450 | mcg | 35% |
| Niacin | 6 | mg | 35% |
| Vitamin B6 | 600 | mcg | 35% |
| Folate | 132 | mcg | 35% |
| Vitamin B12 | 1 | mcg | 35% |
| Biotin | 10 | mcg | 35% |
| Pantothenic Acid | 2 | mg | 35% |
| Calcium | 480 | mg | 35% |
| Iron | 6 | mg | 35% |
| Phosphorus | 450 | mg | 35% |
| Chloride | — | mg | † |
| Sodium | 175 | mg | 7% |
| Potassium | 1,600 | mg | 35% |

Sensory Evaluation. FFAs produced from the vegetable oil blend were found to be unpalatable by a taste panel. Surprisingly, the MAG oil produced from this blend was palatable and similar in the taste and texture of the original triglyceride oil. When the MAG oil was formulated into the RTDS product described above, the flavor was acceptable and indistinguishable from similar commercial products with intact (un-digested) lipids and proteins.

Example 5: Production of Multiple Batches of EMO

The timing of the process described in Example 1 for manufacturing EMO was evaluated to generate oil that was greater than 70% MAG, greater than >85% MAG+FFA and TAG content of 5% or less.

Table 4 depicts a scan of TLC plates illustrating the concentrations of MAG and FFA in the enzyme modified EMO produced from an olive oil/flax oil/sunflower oil blend (ratio of 7/2/1). In these experiments, step 2 was extended to 84 hours to establish upper limits on timing and temperature to avoid TAG formation.

| Experiment | TAG | DAG | MAG | FFA | FFA + MAG |
|---|---|---|---|---|---|
| 1 | 4 | 26 | 57 | 13 | 70 |
| 2 | 4 | 11 | 72 | 13 | 85 |
| 3 | 5 | 10 | 76 | 9 | 85 |

The reaction can be monitored in essentially real time with TLC analysis and stopped at any point during step 2 to yield to desired amounts of MAG, DAG, TAG and FFA. Reaction time of 72 hours for step 2 was found to be a practical and productive stopping point and illustrated in Example 6.

Example 6: Evaluation of TAG-Free Enzyme Modified Almond Oil by NMR Analysis

TAG-free EMO was produced using almond oil. Reaction conditions were as described in Example 1. Step 2 was 72 hours to minimize TAG production.

Figure 6A:
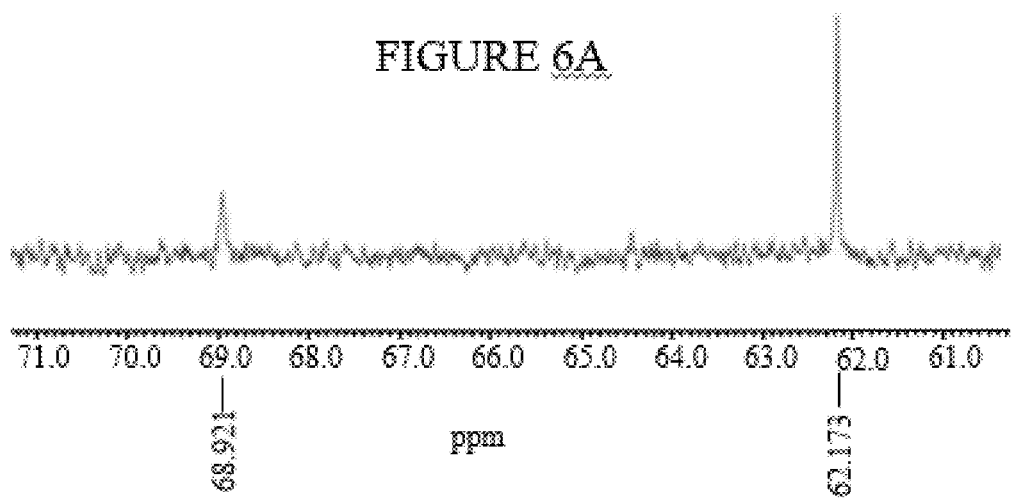
FIG. 6A depicts the NMR spectrum of authentic TAG (tristerin).
Figure 6B:
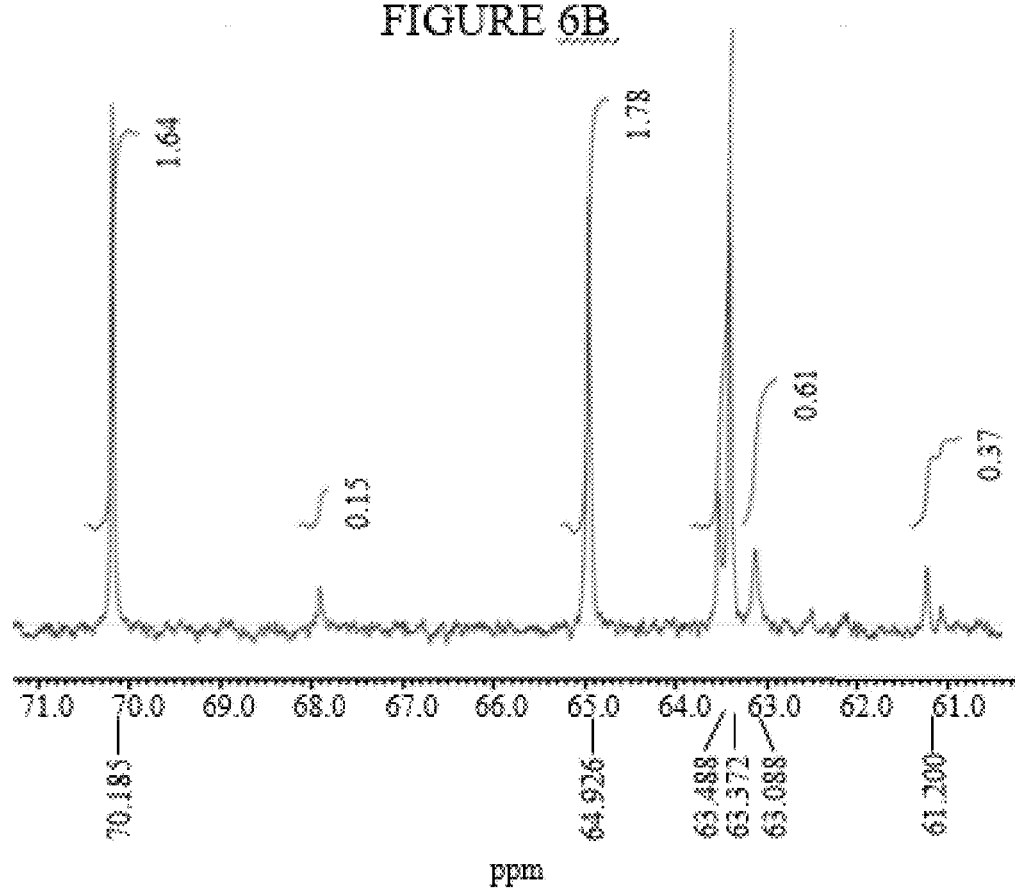
FIG. 6B depicts the NMR spectrum for enzyme modified oil produced from almond oil.

FIGS. 6A-6B depict the $^{13}$C-NMR analysis of the EMO produced from almond oil. FIG. 6A illustrates that $^{13}$C-NMR signal associated with authentic TAG (tristerin) and the characteristic peaks at 62.173 ppm and 68.921 ppm. FIG. 6B illustrates the $^{13}$C-NMR signal for the EMO. It shows that there is no discemable TAG signals. Integration of the actual signals indicates an acyl glycerol distribution between MAG:DAG of 88%:12%. Samples were analyzed on a JEOL model ECA600II NMR spectrometer operating at 600 MHz proton and 150 MHz carbon. Samples were made up in 5 mm tubes and run locked with CDCl3 at ambient temperature.

Example 7: Clinical Testing of an EMO-Based Ready-to-Drink-Shake

A study was designed to show that patients with EPI can consume food produced with the TAG-free oils we have produced, without taking their enzyme supplement medication, and still absorb the lipids and produce TAGs in their serum.

The clinical study was a single center, randomized, double-blind, cross-over trial assessing an EMO-based ready-to-drink shake (RTDS) for blood lipid levels, safety, tolerability and palatability compared to a standard nutritional supplement used concomitantly with pancreatic enzyme replacement therapy capsules ("PERT").

Inclusion Criteria for the study included:
1. Provision of signed and dated informed consent form.
2. Stated willingness to comply with all study procedures and availability for the duration of the study.
3. Male or female, aged 12 years or older.
4. Diagnosis of CF
5. Currently receiving treatment with a commercially available pancreatic enzyme product for more than 3 months.
6. Clinically stable condition without evidence of acute respiratory disease within 1 month of enrollment.
7. Stable body weight defined as no more than 5% decline within 3 months of enrollment.
8. Females of child-bearing potential should agree to continue using a medically acceptable method of birth control throughout the study and for 30 days immediately after the last dose of study drug. Medically acceptable methods of birth control include bilateral tubal ligation or the use of either a contraceptive implant, a contraceptive injection (Depo-Provera™), an intrauterine device, or an oral contraceptive taken within the past 3 months where the subject agrees to continue using during the study or to adopt another birth control method, or a double-barrier method which consists of a combination of any two of the following: diaphragm, cervical cap, condom, or spermicide.
9. Ability to take oral medication and oral liquid nutritional supplements and be willing to adhere to the study interventions.
10. Agreement to adhere to Lifestyle Considerations (see Section 5.3) throughout the duration of the study.

Exclusion Criteria for the study included:
1. Evidence of cardiovascular, respiratory (except underlying disease), urogenital, gastrointestinal/hepatic (except underlying disease), hematologic/immunologic, head, ears, eyes, nose, throat, dermatologic/connective tissue, musculoskeletal, metabolic/nutritional (except underlying disease), endocrine (except controlled diabetes mellitus), neurologic/psychiatric, milk, nut or soy allergies, recent major surgery, or other relevant diseases as revealed by history, physical examination and/or laboratory assessments, which could limit participation in or completion of the study.
2. History of acute abdomen in the last year.
3. History of fibrosing colonopathy.
4. History of distal intestinal obstruction syndrome (DIOS) within 6 months prior to enrollment.
5. Solid organ transplant or surgery affecting the large bowel other than appendectomy.
6. Small bowel surgery that significantly affected absorptive capacity (e.g. gastrectomy or pancreatectomy).
7. Intestinal inflammatory diseases including chronic diarrheal illness unrelated to pancreatic insufficiency.
8. Celiac disease or Crohn's disease.
9. Receiving enteral tube feeds for ≥50% of daily calorie intake.
10. Pregnancy or lactation.
11. Any type of malignancy involving the digestive tract in the last 5 years.
12. Known allergy to pancreatin or inactive ingredients (excipients) of pancreatin capsules.
13. Suspected non-compliance or non-cooperation.
14. Intake of experimental drugs within 30 days prior to study start.
15. Mental disability or any other lack of fitness, in the Investigator's opinion, to preclude subject's participation in or ability to complete the study.
16. Diagnosis of human immunodeficiency virus in medical history.
17. Listed for lung transplantation or other solid organ transplant or documented forced expiratory volume (FEV)≤25%.
18. Use of lipid lowering therapy including statins, fibrates, niacin, and proprotein convertase subtilisin kexin type 9 (PCSK9) inhibitors that cannot be held at least 14 days prior to Day 1 and through Day 15 of the study. Patients were male or female, aged 12 years or older with a diagnosis of cystic fibrosis. Patients were also currently receiving treatment with a commercially available pancreatic enzyme product for more than 3 months and had a clinically stable condition without evidence of acute respiratory disease within 1 month of enrollment.

Patients came to the clinic after an overnight fast and standardized evening meal. Those in Arm 1 (10 patients) were administered the RTDS along with a PERT placebo and those in Arm 2 (10 patients) were administered standard nutritional supplement with PERT. Serial blood samples over 6 hours (0, 1, 2, 3, 4, 5, 6 hours) were obtained from patients in both study arms, with no repeat serving of the RTDS or standard nutritional supplement. Water could be consumed during the study.

Patients returned to the clinic for Treatment 2 (cross-over treatment) after overnight fast and standardized evening meal. Patients in Arm 1 were administered the standard nutritional supplement with PERT, while patients in Arm 2 were administered the RTDS along with PERT placebo. Serial blood samples over 6 hours (0, 1, 2, 3, 4, 5, 6 hours) were obtained from patients in both study arms, with no repeat serving of the RTDS or standard nutritional supplement.

The standard nutritional supplement contained: Water, Glucose Syrup, Sugar, Vegetable Oil (Canola, High Oleic Sunflower, Com), Milk Protein Concentrate, and less than 2% of Soy Protein Isolate, Calcium Caseinate, Sodium Caseinate, Gum Acacia, Fructooligosaccharides, Inulin (from Chicory), Soy Lecithin, Salt, Natural and Artificial Flavor, Carrageenan Potassium Citrate, Calcium Phosphate, Magnesium Phosphate, Magnesium Chloride, Sodium Ascorbate, Choline Bitartrate, DL-Alpha Tocopheryl Acetate, Ascorbic Acid, Potassium Chloride, Ferrous Sulfate, Zinc Sulfate, Niacinamide, Calcium Pantothenate, Manganese Sulfate, Copper Sulfate, Pyridoxine Hydrochloride, Thiamine Hydrochloride, Beta-Carotene, Vitamin A Palmitate, Riboflavin, Folic Acid, Chromium Chloride, Biotin, Potassium Iodide, Phytonadione, Sodium Selenite, Sodium Molybdate, Vitamin D3, Vitamin B12.

The RTDS contained: Water, Organic Date Syrup, Enzymatically Modified Almond Oil, Enzymatically Hydrolyzed Pea Protein, Soluble Corn Fiber, Cocoa Powder, Natural Flavors, Salt, Vitamin C, Vitamin E (dl-alpha-tocopheryl acetate), Niacinamide, Pantothenic acid (calcium-D-pantothenate), Vitamin B6 (pyridoxine hydrochloride), Vitamin A (retinyl palmitate), Vitamin B2 (riboflavin), Vitamin B1 (thiamine hydrochloride), L-methylfolate, Vitamin K1, Vitamin D3 (cholecalciferol), Biotin, Vitamin B12 (cyanocobalamin).

The nutritional supplement was 5.9% fat, 5.9% protein and 19% carbs by weight while the RTDS was 7.4% fat, 4.7% protein and 9.8% carbs by weight.

The dosage of lipid was 0.5 g/kg body weight. The lipid in the standard nutritional supplement was a blend of TAGs from canola, high oleic sunflower and corn oil. In the interventional drink the MAGs were produced from almond oil. The dosage of lipid for each patient was based upon well-established "Lipid Tolerance Tests", which are similar in design and scope to well-known glucose tolerance tests. The recommended dosage for these tests is 0.5-1.0 g/kg administered over 20-30 minutes. Samples were taken at the start of the test and hourly for 6 hours. Serum triglyceride levels were measured using standard laboratory methods.

The PERT dosage used in the study followed the manufacturer's recommended dosage guidelines of 2,500 iu of lipase activity per gram of fat ingested. This translated to 3-4 capsules during the crossover stage of the study.

Figure 7:
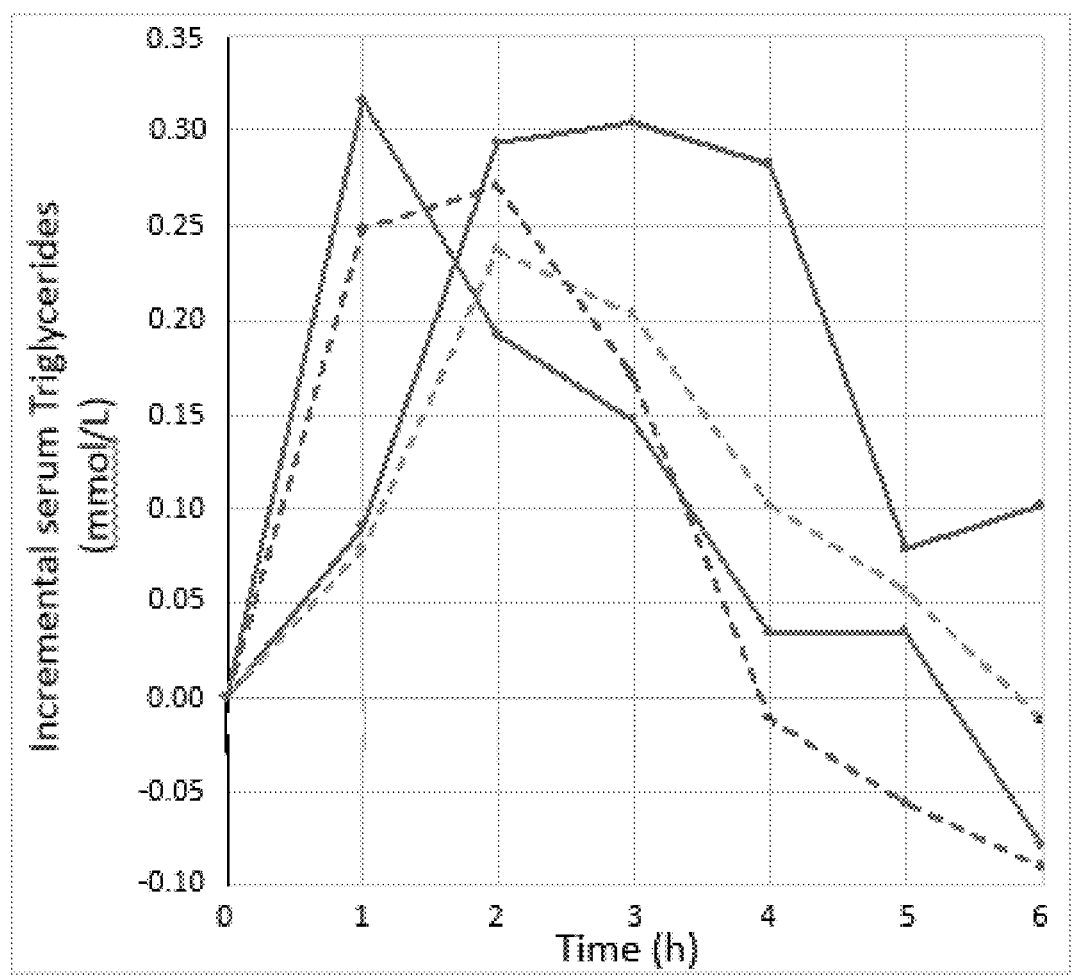
FIG. 7 depicts the increase in serum triglycerides following ingestion of the EMO-based ready-to-drink shake.

FIG. 7 depicts the increase in serum triglycerides following ingestion of the EMO-based ready-to-drink shake in two patients. In FIG. 7, the dashed lines represent patients that received 0.5 g per Kg of body weight of enzyme-modified almond oil and the solid lines represent patients that received 0.5 g per Kg of body weight of canola, high oleic sunflower and corn oil incorporated into the RTDS consumed over a half-hour period. FIG. 7 illustrates that the enzyme-modified oil in the RTDS was absorbed by the patients and converted into serum triglycerides.

Figure 8:
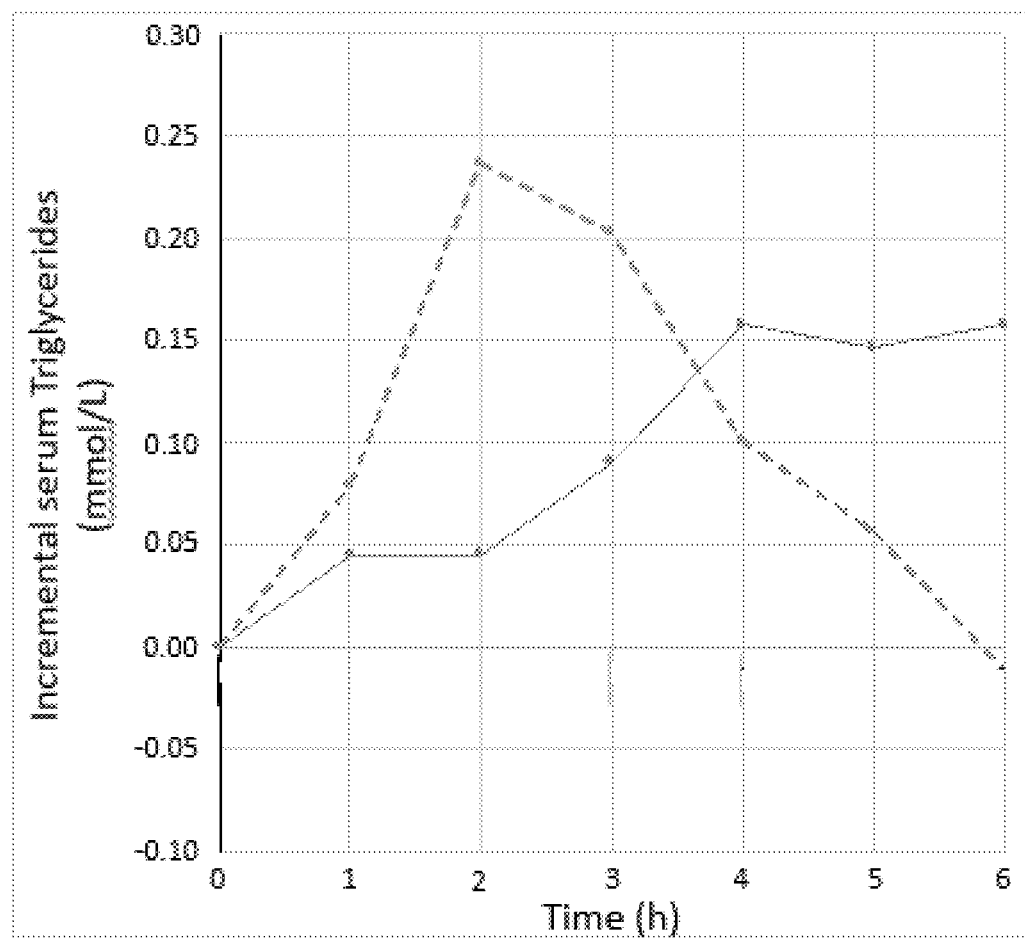
FIG. 8 depicts the increase in serum triglycerides following ingestion of MAG-based RTDS without PERT.

FIG. 8 depicts the increase in serum triglycerides in another patient following ingestion of the test drinks. In FIG. 8, the dashed line represents serum triglycerides following ingestion of MAG-based RTDS without PERT and the solid line represents standard of care RTDS with PERT. The patients received 0.5 g per Kg of body weight of enzyme-modified almond oil or 0.5 g per Kg of body weight of corn oil, incorporated in the RTDS consumed over a half-hour period.

In this patient, the absorption of lipid and conversion to serum triglycerides was significantly faster following ingestion of the MAG-based RTDS without PERT serum than from the TAG-based (standard of care) product with PERT. This suggests that the patient was suffering from cholestasis (disruption of bile flow from the liver) in addition to EPI and not just suffering from lack of sufficient enzymes, and thus could not properly emulsify the canola, high oleic sunflower and corn oil in the standard of care drink. Emulsification of the oil into very small droplets is required to produce the surface area that the pancreatic lipase need hydrolyze the oil into the MAGs and FFA that are transported into the enterocytes. Bile acids from the liver are required for this activity. The TAGs in the standard of care drink could not be emulsified into the micro-emulsions required for optimal lipase activity in the small intestine, and thus serum triglycerides did not increase as quickly as with the MAG formulation, which does not require lipase activity.

The actual dosage of lipids per patient was the same in all cases: 0.5 g/kg body mass.

Sugar intake for a hypothetical 65 kg patient in the study is shown in Table 5 below for the standard nutritional supplement and for the RTDS. Most of the sugar and carbohydrates in the control drink are dextrose or starch, and are readily converted to glucose. In the study drink, the volume of drink the hypothetical 65 kg patient would consume is less (the study drink has a higher concentration of lipids) and the carbohydrates are supplied in lower amounts and as a 50:50 mixture of fructose and glucose. Thus, the actual glucose consumed is less.

| Drink | mL patient will drink in the study | Grams of carbs | Sugar consumed | Glucose consumed |
|---|---|---|---|---|
| | Sugar Intake | | | |
| Control drink | 551 | 105 | 94 | 94 |
| Test drink (RTDS) | 439 | 43 | 29 | 14 |

Figure 9:
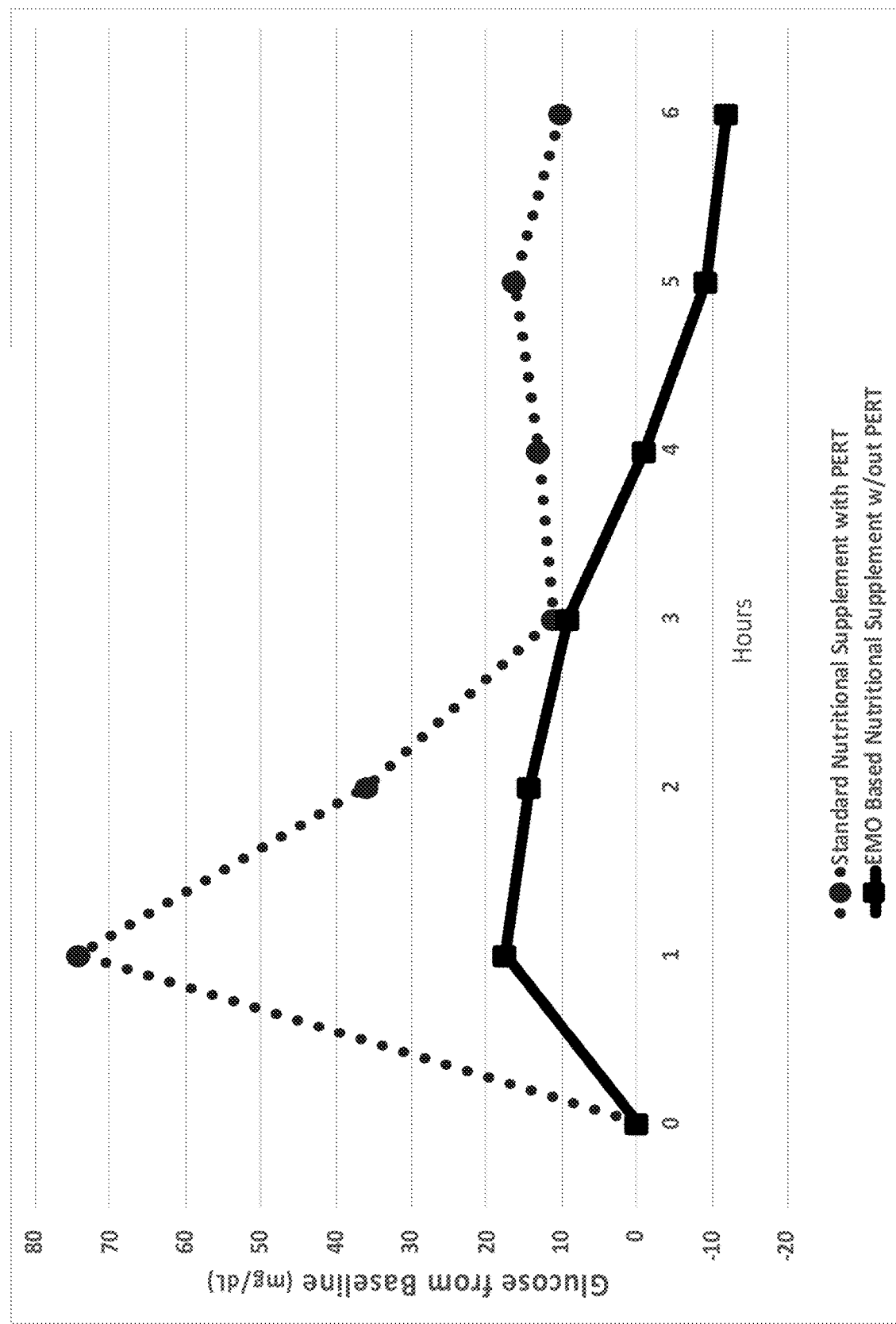
FIG. 9 depicts the serum glucose levels for patients (averaged) following ingestion of MAG-based RTDS without PERT or a standard nutritional supplement with PERT.

FIG. 9 depicts the increase in serum glucose averaged from 8 patients from each of Arm 1 and Arm 2 in the study over the six hour sampling period. Patients who consumed the RTDS showed a pronounced decrease in maximum post-prandial serum glucose and remained below the standard nutritional supplement cohort. These results demonstrate that the EMO-based nutritional supplement, which is high in 1-monoacylglycerols such as 1-oleyl monoglycerol, was able to positively impact glucose homeostasis compared to the standard nutritional supplement with PERT which would only be expected to yield a small amount of 2-monoacylglycerols such as 2-oleyl monoglycerol. Based on the amount of glucose administered, a higher serum glucose level would have been expected for the RTDS cohort and the effect shown is unexpected.

Figure 10:
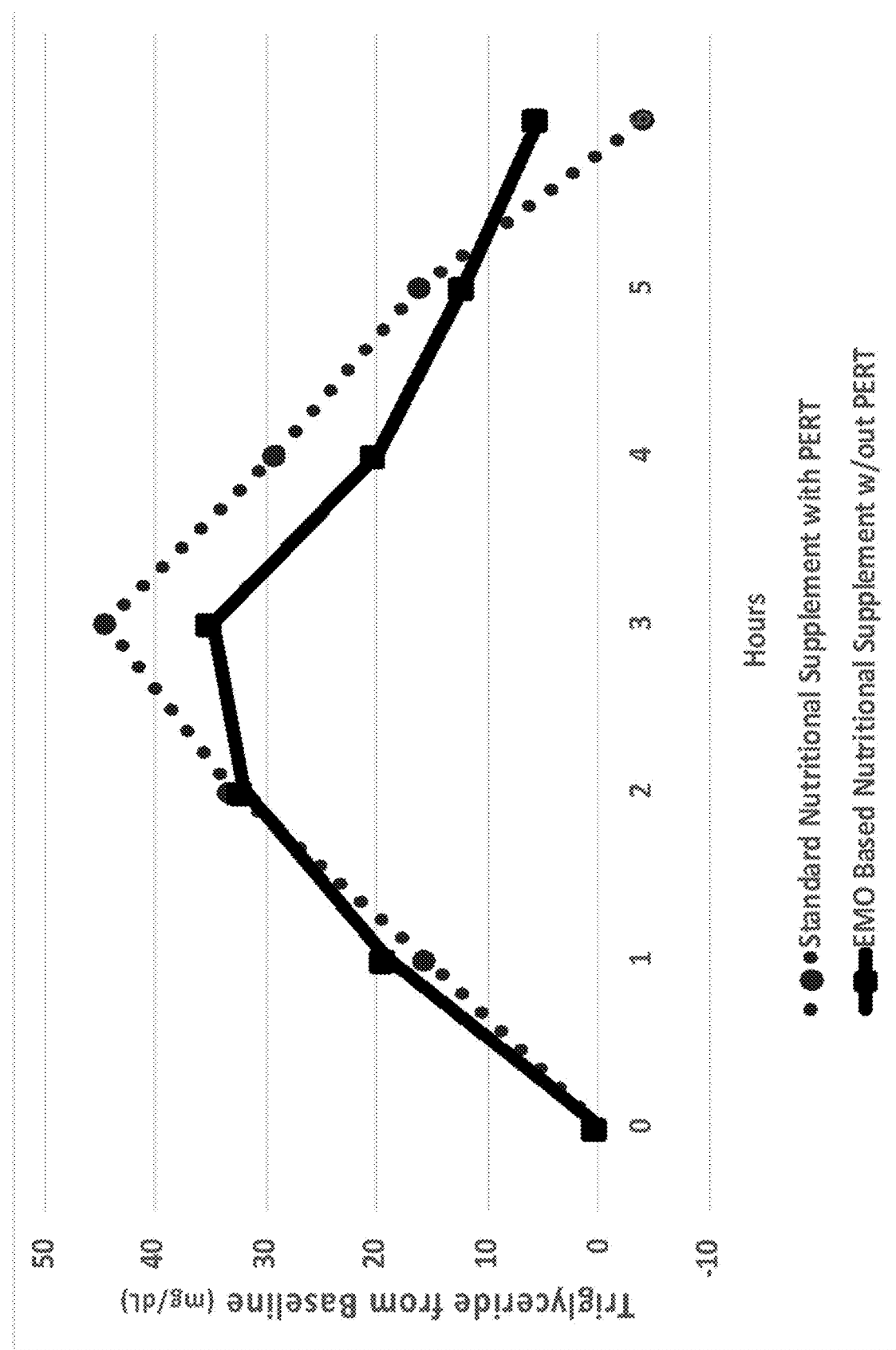
FIG. 10 depicts the serum triglyceride levels for patients (averaged) following ingestion of-based RTDS without PERT or a standard nutritional supplement with PERT.

FIG. 10 depicts the serum triglyceride level averaged from 8 patients from each of Arm 1 and Arm 2 in the study over the six hour sampling period. Both the test and control groups showed similar triglyceride levels which indicate that the patients absorbed the same amount of lipid from either the standard nutritional supplement with PERT or the RTDS without PERT.

Example 8: High Calorie, PERT-Free Ready-to-Drink Shake

A high calorie RTDS can be prepared as follows: Add DI water (~60% of final volume) into main mixing vessel, and heat water to ~60° C. Mix in Hydrolyzed Protein, then add Agave syrup. Else hand mixer to combine. In a separate container, combine warm (60° C.) EMO and lecithin. When lecithin has dissolved, add EMO/Lecithin to aqueous phase & mix. Add additional water to achieve final weight (volume). Emulsify with shear blender. To prepare a very high calorie RTDS, add higher levels of the components.

Following production of the beverage base, various flavors, maskers and blockers can be added to produce unique products such as chocolate, vanilla, strawberry, etc.

This method can also be used to produce high calorie products in semi-solid formats such as puddings, mousses, "popsicles" and ice cream-like products using the beverage base recipe and adding viscosity altering agents such as xanthan gum and gum acacia.

Primary ingredients and nutritional values are shown in Table 6 for a high calorie (1.5 kcal/mL) RTDS.

| Components with significant calories | Wt % | kcal/g | kcal/325 mL drink | kcal/mL |
|---|---|---|---|---|
| EMO | 7.5 | 9 | 219 | 0.7 |
| Agave sugars | 14 | 4 | 182 | 0.6 |
| Hydrolyzed Protein | 5 | 4 | 65 | 0.2 |
| pea fat | 0.7 | 9 | 21 | 0.1 |
| Sunflower lecithin | 0.5 | 9 | 15 | 0.0 |
| Total | 28 | | 502 | 1.5 |

Primary ingredients and nutritional values are shown in Table 7 for a very high calorie (2.5 kcal/mL) RDTS.

| Components with significant calories | Wt % | kcal/g | kcal/325 mL drink | kcal/mL |
|---|---|---|---|---|
| EMO | 12 | 9 | 351 | 1.1 |
| Agave sugars | 20 | 4 | 260 | 0.8 |
| Hydrolyzed Protein | 10 | 4 | 130 | 0.4 |
| pea fat | 1.4 | 9 | 42 | 0.1 |
| Sunflower lecithin | 0.5 | 9 | 15 | 0.0 |
| Total | 44 | | 797 | 2.5 |

Example 9: High Calorie, PERT-Free Bar

A high calorie bar can be prepared as follows: Add DI water (~60% of final volume) into main mixing vessel, and heat water to ~60° C. Mix in Hydrolyzed Protein, then add Agave syrup. In a separate container, combine warm (60° C.) EMO and lecithin with hand mixer. When lecithin has dissolved, add EMO/Lecithin to aqueous phase & mix. Add additional water to achieve final weight (volume).

Primary ingredients and nutritional values are shown in Table 8 for a high calorie, PERT-free bar.

| Components with significant calories | Wt % in product | kcal/g | kcal/60 g bar |
|---|---|---|---|
| EMO | 9 | 9 | 81 |
| Agave sugars | 15 | 4 | 60 |
| Hydrolyzed Protein | 19 | 4 | 76 |
| pea fat | 2.7 | 9 | 24 |
| Sunflower lecithin | 0.5 | 9 | 15 |
| Total | 46 | | 256 |

Following production of the bar base, various flavors, maskers and blockers can be added prior to baking to produce unique products such as chocolate, vanilla etc.

Example 10: Manufacturing of a Ready-to-Drink-Shake

Add DI water into main mixing vessel, and heat water to ~60+/−2° C. Once the water has reached 60° C., slowly add sugar syrup (such as agave or date syrup) with low agitation. Mix into solution. Weigh out the individual dry mass materials (Vitamin/Mineral mix and Hydrolyzed Protein) and combine in a separate container. Mix dry ingredients thoroughly. Slowly add mixed dry ingredients directly into main mixing vessel with sweep agitation at low agitation. Weigh out EMO in separate container. Heat the EMO to 60+/−2° C. ° C. Slowly add Sunflower lecithin to warm EMO and mix with moderate agitation (as needed) until the sunflower lecithin is completely mixed into solution. Slowly add EMO/sunflower lecithin mixture to main mixing vessel. Add distilled water to increase volume to 95% total fluid mass, return temperature at 70+/−2° C. Slowly add flavors and color to main mixing vessel. Slowly add stabilizer (such as acacia gum) to main mixing vessel. Mix solution for 20 minutes (to allow the viscosity to increase). Maintain temperature of solution at 70+/−2° C. QS solution with distilled water to final volume. Pass material through pressure drop homogenizer(s) to produce stable emulsions. Pasteurize or sterilize material. Cool material to room temperature. Fill product into packaging.

Example 11: Removal of MCPD from Almond Oil

Enzyme modified almond oil was prepared as described in Example 6.

Samples of the enzyme-modified almond oil were sent to a third party lab (Eurofins Eurofins Scientific Inc. Nutrition Analysis Center 2200 Rittenhouse Street, Suite 150 Des Moines, Iowa 50321) for analysis using the standard method described below.

AOCS Official Method Cd 29b-13 (Revised 2017)—2- and 3-MCPD Fatty Acid Esters and Glycidol Fatty Acid Esters in Edible Oils and Fats by Alkaline Transesterification and GC/MS. This method is used for the determination of fatty acid esters of 2-chloropropane-1,3-diol (2-MCPD), 3-chloropropane-1,2-diol (3-MCPD) and glycidol in edible oils and fats. See also AOCS Official Methods Cd 29a-13 or Cd 29c-13. Bound glycidol is the sum of all glycidyl derivatives that are cleaved by alkaline-catalyzed alcoholysis. The content of bound glycidol is reported in milligrams per kilogram (mg/kg). Bound 2-MCPD is the sum of all 2-MCPD-derivatives that are cleaved by alkaline-catalyzed alcoholysis. The content of bound 2-MCPD is reported in milligrams per kilogram (mg/kg). Bound 3-MCPD is the sum of all 3-MCPD-derivatives that are cleaved by alkaline-catalyzed alcoholysis. The content of bound 3-MCPD is reported in milligrams per kilogram (mg/kg). This method describes a procedure for the parallel determination of glycidol together with 2-MCPD and 3-MCPD present in bound or free form in oils and fats. The method is based on alkaline-catalyzed ester cleavage, transformation of the released glycidol into monobromopropanediol (MBPD) and derived free diols (MCPD and MBPD) with phenylboronic acid (PBA). Though free MCPD and glycidol are only present in fats and oils in low to negligible quantities, significant content would increase proportionately the determination of bound analytes. This method is applicable to solid and liquid fats and oils.

Results. The total 2-MCPD (free and bound) and 3-MCPD (free and bound) in the starting oil was 0.65 mg/kg and 1.17 mg/kg, respectively. The enzyme modified almond oil (Example 6) had a total 2-MCPD (free and bound) and 3-MCPD (free and bound) each of <0.10 mg/kg, which is below the limit of quantification of the assay to measure MCPD (0.10 mg/kg). Thus, the sums of the total detected MCPD in the starting almond oil and in the enzyme modified oil was 1.82 mg/kg and <0.10 mg/kg, respectively.

Therefore, the present invention is well adapted to attain the ends and advantages mentioned as well as those that are inherent therein. While numerous changes may be made by those skilled in the art, such changes are encompassed within the spirit of this invention as illustrated, in part, by the appended claims.

Example 12: Fatty Acid Profiles in Starting Oils and MAG Oils

MCT, canola and almond oils were processed according to the manufacturing method of the present disclosure. Fatty acid profiles for each were measured in both the starting oil and the MAG oil as shown in Table 9 below.

Fatty acids were analyzed after derivatization as the fatty acid methyl esters and compared to standards. For the derivatization, a sample (500 µl) was added to a 5-ml reaction tube containing 2 ml boron trifluoride solution (12% in methanol), 20 µl dimethoxypropane and 100 µl of a tridecanoic acid internal standard solution (10 mg/ml). The reaction tube was vortexed and incubated in a heating block at 60° C. for 30 minutes. The reaction tube was removed from the heating block and allowed to cool for 15 minutes. Then, 1 ml of distilled water was added to quench the reaction, followed by 1 ml of hexane. The reaction tube was vortexed for 60 seconds and the phases were allowed to separate for 3 minutes. The top (hydrophobic) phase was removed to a 1.5-ml tube containing about 50 mg sodium sulfate (anhydrous). After vortexing for 60 seconds, the 1.5-ml tube was centrifuged and ~500 µl of the clarified, dried hydrophobic phase was transferred to a gas chromatography sample vial. Samples were analyzed using an Agilent 7890A gas chromatograph with Flame ionization detector and Agilent Openlab CDS Chemstation software. GC Column: Omegawax 100 (15 m×0.1 mm×0.1 um) column. Results were converted to weight % by internal standard reference.

As shown, both the starting oil and MAG oil contained substantially the same fatty acid profiles.

A separate experiment was run using almond and canola oil to obtain the data in Table 10 which show the same result for oleic, linoleic and linolenic acid.

| FATTY ACID | Almond | Canola | Almond MAG | Canola MAG |
|---|---|---|---|---|
| C18:1cis (n-9) Oleic | 63.2 | 59.33 | 63.31 | 59.33 |
| C18:2cis (n-6) Linoleic | 25.28 | 19.07 | 25.14 | 19.07 |
| C18:3 (n-3) Linolenic | 0.29 | 8.26 | 0.2 | 8.22 |
| Oleic/Linoleic ratio | 2.5 | 3.1 | 2.5 | 3.1 |
| Oleic/Linolenic ratio | 218 | 7 | 317 | 7 |

These results demonstrate that the manufacturing process of the present disclosure is able to preserve the fatty acid profile of the starting oil in the MAG oil. This result is different than for conventional "distilled" oils whose fatty acid profile differs significantly from the starting oil based on the functional use of the distilled oil.

These results also demonstrate that the processed oils of the present disclosure can be used to provide "complete nutrition" by providing linoleic acid and linolenic acid. Similar results would be expected for oils high EPA and DHA, such as fish oils and algal oils to provide complete nutritional formulations.

Figure 11:
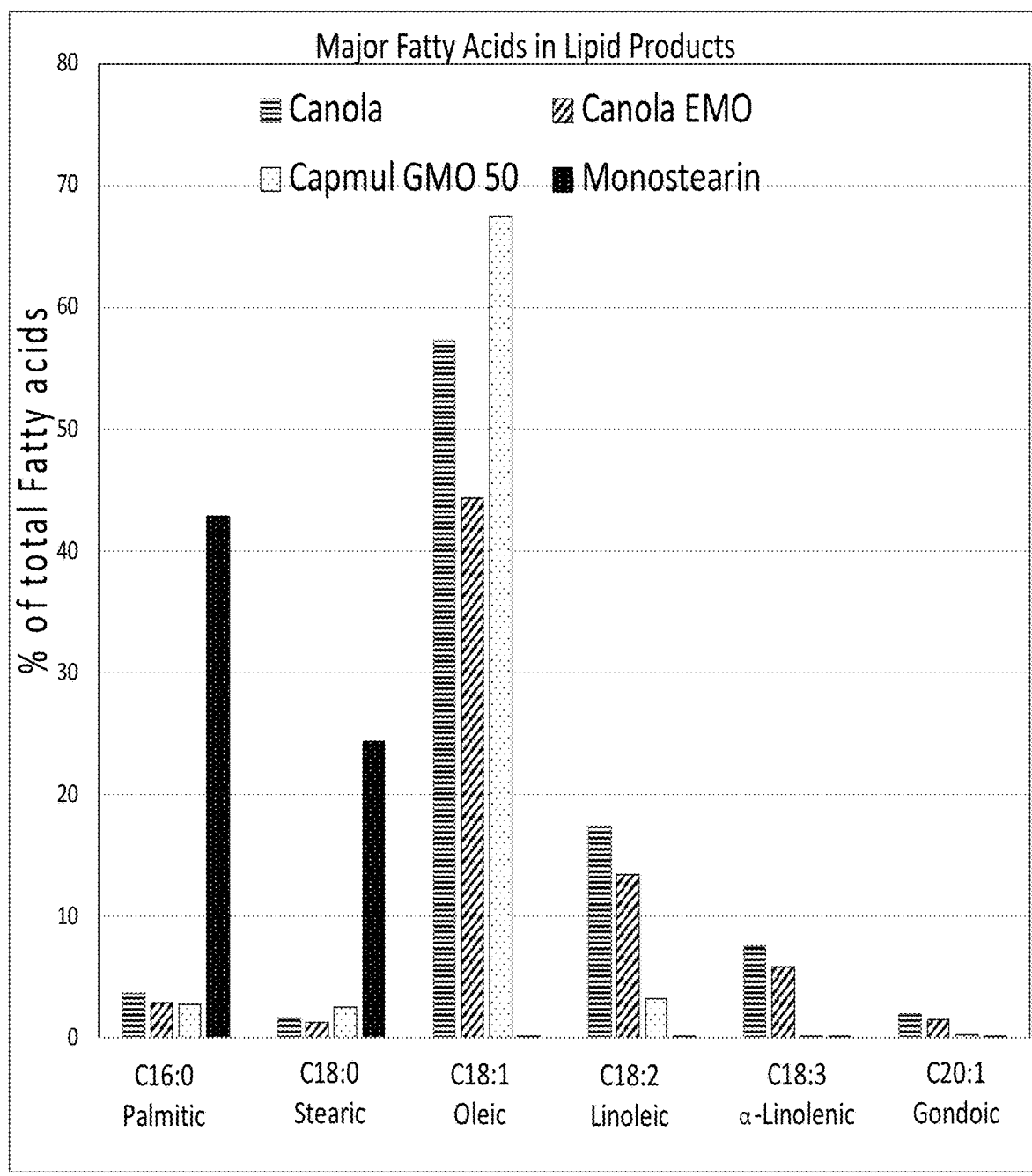
FIG. 11 depicts the percentage of certain fatty acids in the canola oil and canola EMO of Example 13 and two commercial monoglyceride samples.

Example 13: The EMO Process Conserves Essential Fatty Acids Found in Original Oil Canola EMO was produced as described in Example 1. Fatty acids were measured as described in Example 2. Results of the fatty acid analysis are shown in FIG. 11. Canola oil and the EMO produced from the canola oil maintaining the integrity of the fatty acid profile and include the essential fatty acids linoleic and linolenic acids. Similar results were obtained with EMO from olive oil, sunflower oil and almond oil. Commercial "Monostearin" (Profood

| Compound | MCT | MCT MAG | Canola | Canola MAG | Almond | Almond MAG |
|---|---|---|---|---|---|---|
| C6:0 (Caproic acid) | 5.43% | 0.06% | | | | |
| C8:0 (Caprylic acid) | 58.41% | 57.42% | | | | |
| C10:0 (Capric acid) | 40.96% | 41.96% | | | | |
| C11:0 (Undecanoic acid) | 0.07% | 0.07% | | | | |
| C12:0 (Lauric acid) | 0.32% | 0.32% | | | | |
| C14:0 (Myristic acid) | 0.03% | 0.03% | 0.05% | 0.06% | 0.06% | 0.06% |
| C16:0 (Palmitic Acid) | | | 4.06% | 4.06% | 6.61% | 5.65% |
| C16:1 Total (Palmitoleic Acid + isomers) | | | 0.30% | 0.30% | 0.57% | 0.57% |
| C17:0 (Margaric Acid) | | | 0.04% | 0.04% | 0.06% | 0.06% |
| C17:1 (Heptadecenoic Acid) | | | 0.05% | 0.06% | 0.11% | 0.11% |
| C18:0 (Stearic Acid) | | | 1.78% | 1.78% | 1.56% | 1.57% |
| C18:1 (Vaccenic acid) | | | 3.28% | 3.27% | 1.38% | 1.39% |
| C18:1. Total (Oleic Acid + isomers) | 0.04% | 0.08% | 62.78% | 62.66% | 64.79% | 64.94% |
| C18:2. Total (Linoleic Acid + isomers) | 0.04% | 0.04% | 19.07% | 19.07% | 25.28% | 25.14% |
| C18:3. Total (Linolenic Acid + isomers) | | | 8.26% | 8.22% | 0.29% | 0.28% |
| C18:4 Total (Octadecatetraenoic Acid) | | | 0.04% | 0.04% | 0.09% | 0.08% |
| C20:0 (Arachidic Acid) | | | 0.57% | 0.58% | 0.08% | 0.07% |
| C20:1 Total (Gondoic Acid + isomers) | | | 2.10% | 2.08% | 0.14% | 0.14% |
| C20:2 Total (Eicosadienoic Acid) | | | 0.11% | 0.18% | 0.12% | 0.14% |
| C22:0 (Behenic Acid) | | | 0.31% | 0.31% | 0.03% | 0.04% |
| C22:1 Total (Erucic Acid + isomers) | | | 0.02% | | | |
| C24:0 (Lignoceric Acid) | | | 0.15% | 0.16% | | |
| C24:1 Total (Nervonic Acid + isomers) | | | 0.16% | 0.16% | | |

Products, Naperville, Ill.) contains little or no unsaturated fatty acids, while "Capmul GMO 50" (Abitec Corporation, Janesville, Wis.) contains predominantly the mono-saturated fatty acid oleic acid, little linoleic and virtually no linolenic or Gondoic (C20:1) fatty acid.

Example 14: Beneficial Compounds are Preserved

Figure 12A:
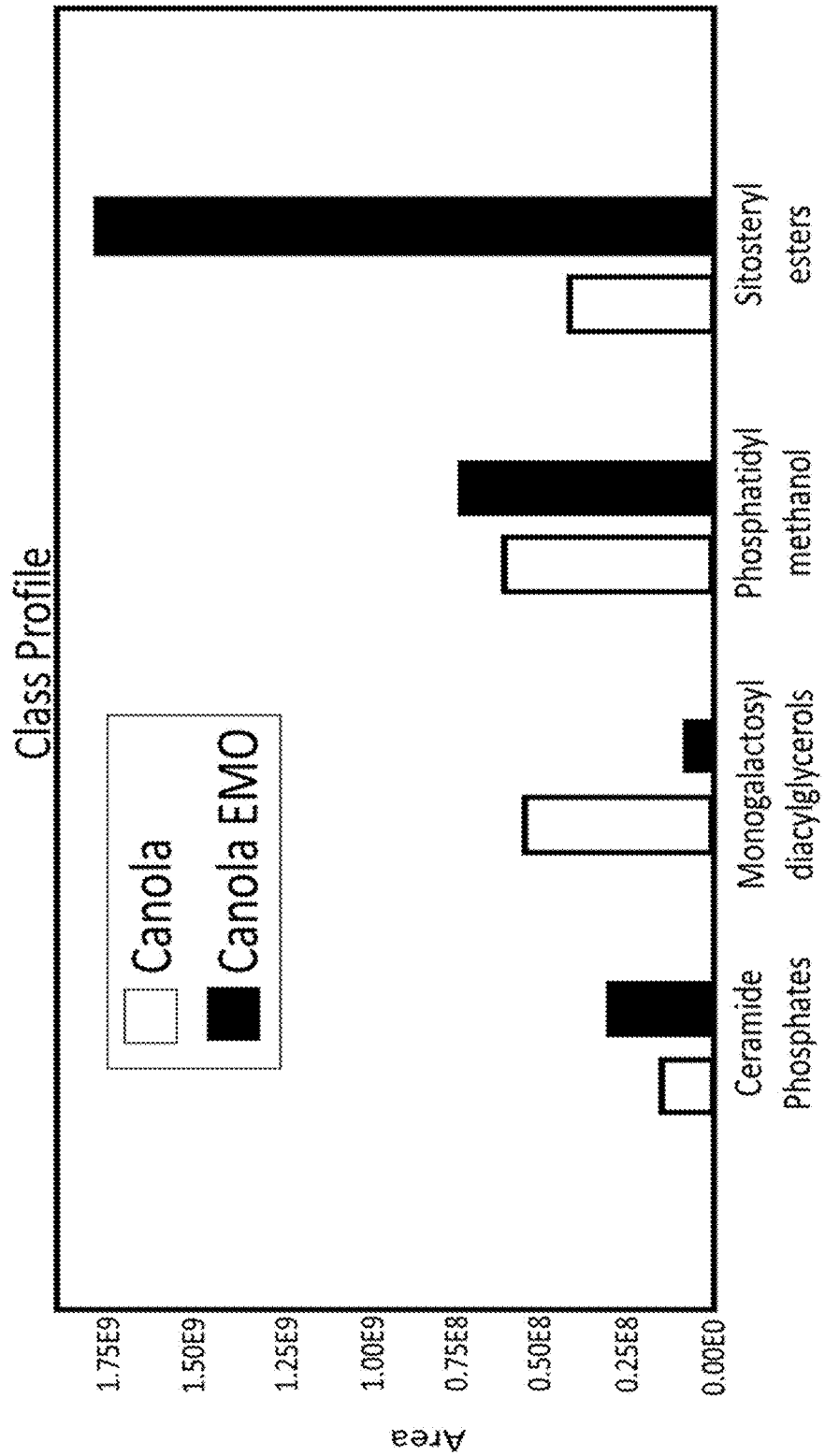
FIG. 12A depicts the amount of various compounds in the canola oil and canola EMO of Example 14 based on LC/MS/MS analysis.
Figure 12B:
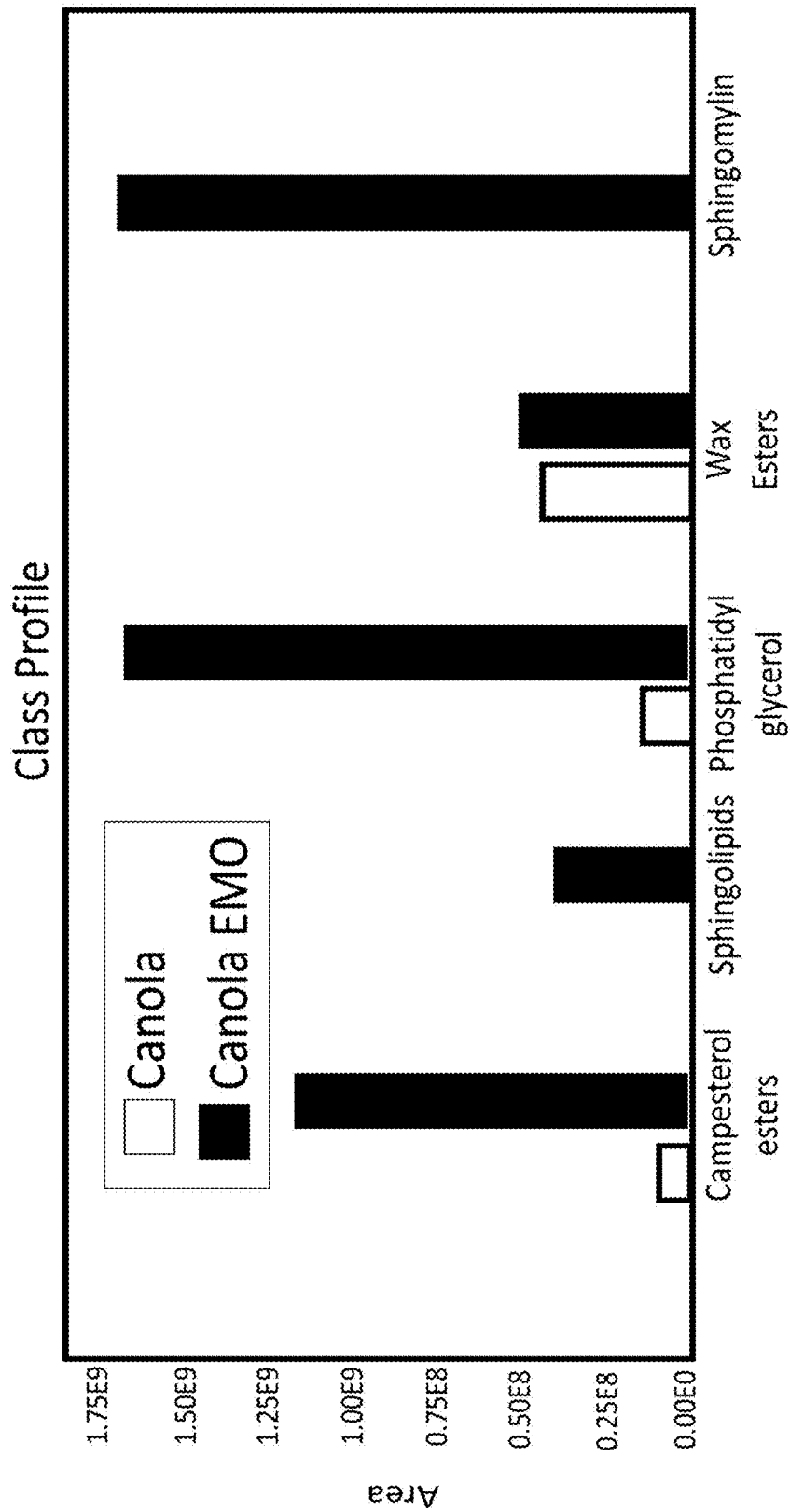
FIG. 12B depicts the amount of various compounds in the canola oil and canola EMO of Example 14 based on LC/MS/MS analysis.

Vegetable oils contain trace quantities of many lipids, steroids, esters and phenolic compounds that contribute to the taste and health benefits of the oils. Many of these compounds are preserved or enriched in the EMO process. This is illustrated in FIGS. 12A-12B. Canola EMO was prepared as described in Example 1. Lipid samples were derivatized with 3-picolylamide for LC/MS/MS analysis. In brief, 150 μL of standard (0.1-100 μg/mL) and 20 μL of internal standard mixture were mixed and dried under nitrogen. To the dried residue was added 200 μL of oxalyl chloride (2 M in dichloromethane), and the mixture was incubated at 65° C. on a heating block for 5 min and then dried under nitrogen. To the residue was added 150 μL of 3-picolylamine (1% in acetonitrile, v/v) to form the 3-picolylamide (FA-PA). The mixture was incubated at room temperature for 5 min, followed by drying under nitrogen to give the derivatized FAs. The dried FAs derivatives were dissolved in 1000 μL of ethanol and further diluted up to 10-fold with ethanol prior to LC-MS analysis. LC-MS analysis was in Ionization mode: positive (total fatty acid & lipidomics) & negative (lipidomics) ionization. Software used for analysis: Thermo Scientific Freestyle & Lipid-Search. Orbitrap fusion method: data dependent acquisition $MS^2$ (total fatty acid) & MS.

Compounds that were preserved or enhanced include: Glycosphingolipids (e.g. Ceramide Phosphate), Glycoglycerolipids (e.g. Monogalactodiacylglycerol), Phosphatidyl-methanol, Steroids (e.g. Sitosteryl ester), Neutral lipids (e.g. Campesterol ester), Sphingolipids, phosphatidyl glycerol, wax esters and sphingomyelin. Coenzyme was also found to be enhanced.

These compounds are not retained in commercial (distilled) monoglyceride products.

In a first embodiment, a food product comprises an oil and has a total caloric content of from about 25 kcal to about 1,000 kcal, wherein from about 5% to about 75% of the total caloric content is derived from said oil, and wherein the oil comprises less than 10% by weight triacylglycerides (TAGs) based on the total weight of the oil, wherein the oil is substantially free of monochloropropandiol (MCPD).

In an aspect of the first embodiment, the oil comprises greater than 50% by weight monoacylglyceride (MAGs) based on the total weight of the oil.

In another aspect of the first embodiment, the oil comprises greater than 60% by weight MAGs based on the total weight of the oil.

In another aspect of the first embodiment, the oil comprises greater than 70% by weight MAGs based on the total weight of the oil.

In another aspect of the first embodiment, the oil comprises greater than 80% by weight MAGs based on the total weight of the oil.

In another aspect of the first embodiment, the oil comprises greater than 90% by weight MAGs based on the total weight of the oil.

In another aspect of the first embodiment or any of the foregoing aspects of the first embodiment, from about 10% to about 60% of the total caloric content is derived from said oil.

In another aspect of the first embodiment or any of the foregoing aspects of the first embodiment, from about 20% to about 50% of the total caloric content is derived from said oil.

In another aspect of the first embodiment or any of the foregoing aspects of the first embodiment, from about 25% to about 45% of the total caloric content is derived from said oil.

In another aspect of the first embodiment or any of the foregoing aspects of the first embodiment, from about 30% to about 40% of the total caloric content is derived from said oil.

In another aspect of the first embodiment or any of the foregoing aspects of the first embodiment, the food product further comprises a carbohydrate source.

In another aspect of the first embodiment or any of the foregoing aspects of the first embodiment, the food product further comprises a carbohydrate source and the carbohydrate source comprises a fruit or agave syrup.

In another aspect of the first embodiment or any of the foregoing aspects of the first embodiment, the food product further comprises a carbohydrate source and the carbohydrate source comprises simple sugars.

In another aspect of the first embodiment or any of the foregoing aspects of the first embodiment, the food product further comprises a carbohydrate source and from about 20% to about 50% of calories are derived from the carbohydrate source.

In another aspect of the first embodiment or any of the foregoing aspects of the first embodiment, the food product comprises a carbohydrate source and further comprises a protein source.

In another aspect of the first embodiment or any of the foregoing aspects of the first embodiment, the food product comprises a carbohydrate source and further comprises a protein source, and from about 10% to about 50% of calories are derived from the protein source.

In another aspect of the first embodiment or any of the foregoing aspects of the first embodiment, the food product comprises a carbohydrate source and further comprises a protein source, and the protein source comprises an hydrolyzed or partially hydrolyzed protein.

In another aspect of the first embodiment or any of the foregoing aspects of the first embodiment, the food product comprises a carbohydrate source and further comprises a protein source, and the protein source comprises an hydrolyzed or partially hydrolyzed protein, wherein the hydrolyzed protein is selected from hydrolyzed pea protein and a whey-based hydrolysate product.

In another aspect of the first embodiment or any of the foregoing aspects of the first embodiment, the food product further comprises a protein source.

In another aspect of the first embodiment or any of the foregoing aspects of the first embodiment, the food product further comprises a protein source, wherein from about 10% to about 50% of calories are derived from the protein source.

In another aspect of the first embodiment or any of the foregoing aspects of the first embodiment, the food product further comprises a protein source, wherein the protein source comprises an hydrolyzed or partially hydrolyzed protein.

In another aspect of the first embodiment or any of the foregoing aspects of the first embodiment, the food product further comprises a protein source, wherein the protein source comprises an hydrolyzed or partially hydrolyzed protein, and wherein the hydrolyzed protein is selected from hydrolyzed pea protein and a whey-based hydrolysate product.

In another aspect of the first embodiment or any of the foregoing aspects of the first embodiment, the oil is a processed oil derived from an oil source.

In another aspect of the first embodiment or any of the foregoing aspects of the first embodiment, the oil is a processed oil derived from an oil source, wherein the processed oil comprises non-oil ingredients derived from and naturally present in the oil source such that the non-oil ingredients are not added to the processed oil.

In another aspect of the first embodiment or any of the foregoing aspects of the first embodiment, the oil is a processed oil derived from an oil source, wherein the processed oil comprises non-oil ingredients derived from and naturally present in the oil source such that the non-oil ingredients are not added to the processed oil, and wherein the non-oil ingredients are selected from antioxidants, vitamins, and mixtures thereof.

In another aspect of the first embodiment or any of the foregoing aspects of the first embodiment, the oil is a processed oil derived from an oil source, wherein the processed oil comprises non-oil ingredients derived from and naturally present in the oil source such that the non-oil ingredients are not added to the processed oil, wherein the non-oil ingredients are selected from antioxidants, vitamins, and mixtures thereof, and wherein the antioxidant is tocopherol.

In another aspect of the first embodiment or any of the foregoing aspects of the first embodiment, the oil is a processed oil derived from an oil source, wherein the processed oil comprises non-oil ingredients derived from and naturally present in the oil source such that the non-oil ingredients are not added to the processed oil, wherein the non-oil ingredients are selected from antioxidants, vitamins, and mixtures thereof, wherein the antioxidant is tocopherol, and wherein said tocopherol is selected from α-tocopherol, β-tocopherol, δ-tocopherol, γ-tocopherol, α-tocotrienol, β-tocotrienol, δ-tocotrienol, and γ-tocotrienol.

In a second embodiment, a food product comprises a processed oil, a carbohydrate source, and a protein source, and having a total weight from about 25 grams to about 500 grams with a caloric density of from about 1 kcal per gram to about 5 kcal per gram, wherein the processed oil comprises from about 10% to about 50% of the total caloric content, and wherein the processed oil has a MAG content of equal to or greater than 40% by weight based on the total weight of the processed oil and a TAG content of equal to or less than 10% by weight based on the total weight of the processed oil, and wherein the processed oil has less than 0.10 mg/kg MCPD.

In a third embodiment, a product comprises a processed oil derived from an oil source, wherein the processed oil comprises a MAG content equal to or greater than 40% by weight of the total weight of the processed oil, wherein the processed oil is either free of TAGs or comprises a TAG content that is equal to or less than 10% by weight of the total weight of the processed oil, and wherein the processed oil comprises non-oil ingredients derived from and naturally present in the oil source such that the non-oil ingredients are not added to the processed oil, wherein the oil source comprise from about 1.00 mg/kg to about 12.00 mg/kg MCPD, and wherein the processed oil comprises less than 0.100 mg/kg MCPD.

In an aspect of the third embodiment, said oil source is from an origin selected from a plant an animal, algae or fish.

In another aspect of the third embodiment, said oil source is of plant origin.

In another aspect of the third embodiment said oil source is selected from the group consisting of olive oil, sunflower oil, corn oil, almond oil, rapeseed oil, palm oil, soybean oil, flaxseed oil, and mixtures thereof.

In another aspect of the third embodiment or any of the foregoing aspects of the third embodiment, the non-oil ingredients are selected from the group consisting of antioxidants, vitamins, and mixtures thereof.

In another aspect of the third embodiment or any of the foregoing aspects of the third embodiment, the non-oil ingredients are selected from the group consisting of antioxidants, vitamins, and mixtures thereof and the antioxidant is tocopherol.

In another aspect of the third embodiment or any of the foregoing aspects of the third embodiment, the non-oil ingredients are selected from the group consisting of antioxidants, vitamins, and mixtures thereof, the antioxidant is tocopherol, and the tocopherol is selected from the group consisting of α-tocopherol, β-tocopherol, δ-tocopherol, γ-tocopherol, α-tocotrienol, β-tocotrienol, δ-tocotrienol, and γ-tocotrienol.

In another aspect of the third embodiment or any of the foregoing aspects of the third embodiment, the processed oil comprises a MAG content of from about 50% to about 95% by weight based on the total weight of the processed oil.

In another aspect of the third embodiment or any of the foregoing aspects of the third embodiment, the processed oil comprises a MAG content of from about 50% to about 95% by weight based on the total weight of the processed oil, and the processed oil comprises a TAG content from about 5% to about 0.5% by weight based on the total weight of the processed oil.

In another aspect of the third embodiment or any of the foregoing aspects of the third embodiment, the processed oil comprises a TAG content from about 5% to about 0.5% by weight based on the total weight of the processed oil.

In a fourth embodiment, a method for making a monoacylglycerol-enriched oil, comprises: mixing a starting oil comprising triacylglycerols (TAGs) and from about 1.00 mg/kg to about 12.00 mg/kg of MCPD, wherein the TAGs are in an amount greater than 50% by weight based on the total weight of the starting oil, a buffer solution and a first enzyme capable of hydrolyzing said TAGs to free fatty acids (FFAs) to yield a first reaction mixture; allowing said first reaction mixture to react under conditions sufficient for said first enzyme to hydrolyze said TAGs for a first period of time to yield an aqueous phase and a first lipid reaction product comprising FFAs; inactivating said first enzyme in said first lipid reaction product; collecting said first lipid reaction product by removing it from the aqueous phase; mixing said first lipid reaction product with a food-grade glycerol and a second enzyme capable of esterifying FFAs to form a second reaction mixture; allowing said second reaction mixture to react for a second period of time to yield a second lipid reaction product comprising a lipid oil phase and a glycerol phase; inactivating said second enzyme in said second lipid reaction product; adding salt to the reaction product and separating the lipid oil phase from said glycerol phase; and collecting said lipid oil phase, wherein the lipid oil phase is substantially free of MCPD.

In an aspect of the fourth embodiment, the starting oil is an oil derived from plant, animal or fish origin.

In another aspect of the fourth embodiment, the starting oil is a plant oil or a mixture of plant oils.

In another aspect of the fourth embodiment, the starting oil is a plant oil selected from the group consisting of olive oil, sunflower oil, corn oil, almond oil, rapeseed oil, palm oil, soybean oil, flaxseed oil, and mixtures thereof.

In another aspect of the fourth embodiment, said first enzyme is a lipase.

In another aspect of the fourth embodiment, said first enzyme is lipase AY.

In another aspect of the fourth embodiment, said buffer solution is a sodium citrate solution.

In another aspect of the fourth embodiment, said first period of time is a period of time sufficient to hydrolyze at least 94% of the TAGs in said starting oil.

In another aspect of the fourth embodiment, said first period of time is between about 14 and about 24 hours.

In another aspect of the fourth embodiment, said step of allowing said reaction mixture to react under conditions sufficient for said first enzyme to hydrolyze said TAGs is performed at a temperature between about 30° C. and about 35° C.

In another aspect of the fourth embodiment, said steps of mixing a starting oil comprising triacylglycerols (TAGs), a buffer solution and a first enzyme capable of hydrolyzing said TAGs to free fatty acids (FFAs) and allowing said reaction mixture to react under conditions sufficient for said first enzyme to hydrolyze said TAGs to FFA are performed under a nitrogen atmosphere.

In another aspect of the fourth embodiment, said second enzyme is a lipase.

In another aspect of the fourth embodiment, said second enzyme is lipase G.

In another aspect of the fourth embodiment, said second period of time is a period of time sufficient to result in enrichment of MAGs in the lipid oil phase of about 60% to 95%.

In another aspect of the fourth embodiment, said second period of time is between about 24 hours and about 72 hours.

In another aspect of the fourth embodiment, said step of allowing said second reaction mixture to react for a second period of time to yield a lipid oil phase and a glycerol phase is performed at a temperature between about 17° C. and 23° C.

In another aspect of the fourth embodiment or any of the foregoing aspects of the fourth embodiment, the method further comprises drying said second lipid reaction product by applying a vacuum for a third period of time sufficient to remove at least a portion of water from the second lipid reaction product.

In another aspect of the fourth embodiment or any of the foregoing aspects of the fourth embodiment, the method further comprises drying said second lipid reaction product by applying a vacuum for a third period of time sufficient to remove at least a portion of water from the second lipid reaction product, wherein said step of drying said second lipid reaction product is performed at a temperature between 20° C.-30° C.

In another aspect of the fourth embodiment or any of the foregoing aspects of the fourth embodiment, the method further comprises drying said second lipid reaction product by applying a vacuum for a third period of time sufficient to remove at least a portion of water from the second lipid reaction product, wherein said drying step is applied throughout the second period of time.

In another aspect of the fourth embodiment or any of the foregoing aspects of the fourth embodiment, said step of inactivating said second enzyme is performed by heating said second lipid reaction product.

In another aspect of the fourth embodiment or any of the foregoing aspects of the fourth embodiment, said step of inactivating said second enzyme is performed by heating said second lipid reaction product, wherein said heating is performed at a temperature of at least 70° C. for at least 1 hour.

In another aspect of the fourth embodiment or any of the foregoing aspects of the fourth embodiment, said step of separating said lipid oil phase from said glycerol phase comprise adding sodium chloride to said second lipid reaction product.

In another aspect of the fourth embodiment or any of the foregoing aspects of the fourth embodiment, said step of separating said lipid oil phase from said glycerol phase comprise adding sodium chloride to said second lipid reaction product, wherein the final concentration of sodium chloride comprises up to 0.3 weight percent sodium chloride.

In another aspect of the fourth embodiment or any of the foregoing aspects of the fourth embodiment, the method further comprises before mixing said first lipid reaction product and food-grade glycerol and a second enzyme capable of esterifying FFAs and glycerol, re-establishing a nitrogen atmosphere over said first lipid reaction product.

In another aspect of the fourth embodiment or any of the foregoing aspects of the fourth embodiment, the method further comprises adding tocopherol to said lipid oil phase after collecting said lipid oil phase.

In another aspect of the fourth embodiment or any of the foregoing aspects of the fourth embodiment, the lipid oil phase comprises MAGs in an amount from about 40% to about 99% by weight based on the total weight of the lipid oil phase and wherein the lipid oil phase either is free of TAGs or comprises TAGs in an about from about 0.1% to about 10% by weight based on the total weight of the lipid oil phase.

In a fifth embodiment, a processed oil comprises oleic acid monolglyceride (MOG) and having a total fatty acid content, wherein said MOG contributes between about 5% and about 75% by weight of the total fatty acid content of the processed oil.

In an aspect of the fifth embodiment, the processed oil comprises less than 10% by weight triacylglycerides (TAGs) based on the total weight of the processed oil.

In another aspect of the fifth embodiment, the processed oil comprises greater than 50% by weight monoacylglyceride (MAGs) based on the total weight of the processed oil.

In another aspect of the fifth embodiment, the processed oil comprises greater than 60% by weight monoacylglyceride (MAGs) based on the total weight of the processed oil.

In another aspect of the fifth embodiment, the processed oil comprises greater than 70% by weight monoacylglyceride (MAGs) based on the total weight of the processed oil.

In another aspect of the fifth embodiment, the processed oil comprises greater than 80% by weight monoacylglyceride (MAGs) based on the total weight of the processed oil.

In another aspect of the fifth embodiment, the processed oil comprises greater than 90% by weight monoacylglyceride (MAGs) based on the total weight of the processed oil.

In another aspect of the fifth embodiment or any of the foregoing aspects of the fifth embodiment, the processed oil is processed oil derived from an oil source.

In another aspect of the fifth embodiment or any of the foregoing aspects of the fifth embodiment, the processed oil is processed oil derived from an oil source, and the processed oil comprises non-oil ingredients derived from and naturally present in the oil source such that the non-oil ingredients are not added to the processed oil.

In another aspect of the fifth embodiment or any of the foregoing aspects of the fifth embodiment, the processed oil is processed oil derived from an oil source, and the processed oil comprises non-oil ingredients derived from and naturally present in the oil source such that the non-oil ingredients are not added to the processed oil, wherein the non-oil ingredients are selected from antioxidants, vitamins, and mixtures thereof.

In another aspect of the fifth embodiment or any of the foregoing aspects of the fifth embodiment, the processed oil is processed oil derived from an oil source, and the processed oil comprises non-oil ingredients derived from and naturally present in the oil source such that the non-oil ingredients are not added to the processed oil, wherein the non-oil ingredients are selected from antioxidants, vitamins, and mixtures thereof, and wherein the antioxidant is tocopherol.

In another aspect of the fifth embodiment or any of the foregoing aspects of the fifth embodiment, the processed oil is processed oil derived from an oil source, and the processed oil comprises non-oil ingredients derived from and naturally present in the oil source such that the non-oil ingredients are not added to the processed oil, wherein the non-oil ingredients are selected from antioxidants, vitamins, and mixtures thereof, wherein the antioxidant is tocopherol, and wherein said tocopherol is selected from α-tocopherol, β-tocopherol, δ-tocopherol, γ-tocopherol, α-tocotrienol, β-tocotrienol, δ-tocotrienol, and γ-tocotrienol.

In another aspect of the fifth embodiment or any of the foregoing aspects of the fifth embodiment, the processed oil is substantially free of monochloropropandiol (MCPD).

In another aspect of the fifth embodiment or any of the foregoing aspects of the fifth embodiment, the processed oil has less than 0.10 mg/kg monochloropropandiol (MCPD).

In another aspect of the fifth embodiment or any of the foregoing aspects of the fifth embodiment, said oil source is from an origin selected from a plant, an animal, algae or fish.

In another aspect of the fifth embodiment or any of the foregoing aspects of the fifth embodiment, said oil source is of plant origin.

In another aspect of the fifth embodiment or any of the foregoing aspects of the fifth embodiment, said oil source is selected from the group consisting of safflower oil, grape oil, *Silybum marianum* oil, hemp oil, sunflower oil, wheat germ oil, pumpkin seed oil, sesame oil, rice bran oil, almond oil, rapeseed oil, peanut oil, olive oil, and coconut oil.

In another aspect of the fifth embodiment or any of the foregoing aspects of the fifth embodiment, said processed oil comprises a MAG content of from about 50% to about 95% by weight based on the total weight of the processed oil.

In another aspect of the fifth embodiment or any of the foregoing aspects of the fifth embodiment, said processed oil comprises a TAG content from about 5% to about 0.5% by weight based on the total weight of the processed oil.

In another aspect of the fifth embodiment or any of the foregoing aspects of the fifth embodiment, the MOG in said processed oil comprises at least 50% by weight 1-oleyl monoglyceride out of the total amount of MOG.

In another aspect of the fifth embodiment or any of the foregoing aspects of the fifth embodiment, the MOG in said processed oil comprises at least 60% by weight 1-oleyl monoglyceride out of the total amount of MOG.

In another aspect of the fifth embodiment or any of the foregoing aspects of the fifth embodiment, the MOG in said processed oil comprises at least 70% by weight 1-oleyl monoglyceride out of the total amount of MOG.

In another aspect of the fifth embodiment or any of the foregoing aspects of the fifth embodiment, the MOG in said processed oil comprises at least 80% by weight 1-oleyl monoglyceride out of the total amount of MOG.

In another aspect of the fifth embodiment or any of the foregoing aspects of the fifth embodiment, the processed oil further comprises linoleic acid, wherein said linoleic acid is present in said processed oil in an amount of about 1.5% to about 90% by weight out of the total fatty acid content of the processed oil.

In another aspect of the fifth embodiment or any of the foregoing aspects of the fifth embodiment, the processed oil further comprises linoleic acid, wherein said linoleic acid is present in said processed oil in an amount of about 10% to about 90% by weight out of the total fatty acid content of the processed oil.

In another aspect of the fifth embodiment or any of the foregoing aspects of the fifth embodiment, the processed oil further comprises linoleic acid, wherein said linoleic acid is present in said processed oil in an amount of about 20% to about 90% by weight out of the total fatty acid content of the processed oil.

In another aspect of the fifth embodiment or any of the foregoing aspects of the fifth embodiment, the processed oil further comprises linoleic acid, wherein said linoleic acid is present in said processed oil in an amount of about 10% to about 25% by weight out of the total fatty acid content of the processed oil.

In another aspect of the fifth embodiment or any of the foregoing aspects of the fifth embodiment, the processed oil further comprises linolenic acid, wherein said linolenic acid is present in said processed oil in amount of about 0.01% to about 2% by weight out of the total fatty acid content of the processed oil.

In another aspect of the fifth embodiment or any of the foregoing aspects of the fifth embodiment, wherein a ratio between the amount of oleic acid and linoleic acid in said processed oil is between about 0.01 and about 5.

In another aspect of the fifth embodiment or any of the foregoing aspects of the fifth embodiment, wherein a ratio between the amount of oleic acid and linoleic acid in said processed oil is between about 1 and about 4.

In another aspect of the fifth embodiment or any of the foregoing aspects of the fifth embodiment, wherein a ratio between the amount of oleic acid and linoleic acid in said processed oil is between about 3 and about 4.

In another aspect of the fifth embodiment or any of the foregoing aspects of the fifth embodiment, wherein a ratio between the amount of oleic acid and linolenic acid in said processed oil is between about 1 and about 100.

In another aspect of the fifth embodiment or any of the foregoing aspects of the fifth embodiment, wherein a ratio between the amount of oleic acid and linolenic acid in said processed oil is between about 10 and about 100.

In another aspect of the fifth embodiment or any of the foregoing aspects of the fifth embodiment, wherein a ratio between the amount of oleic acid and linolenic acid in said processed oil is between about 10 and about 30.

In another aspect of the fifth embodiment or any of the foregoing aspects of the fifth embodiment, wherein said processed oil has a fatty acid profile that is substantially the same as a fatty acid profile of the pre-processed oil from which the processed oil was produced.

In an aspect of the preceding aspect, wherein said fatty acid profile comprises oleic acid, linoleic acid and linolenic acid.

In another aspect of the fifth embodiment or any of the foregoing aspects of the fifth embodiment, wherein the amount of oleic acid, linoleic acid and linolenic acid in the processed oil is within about 10% of the amount of oleic acid, linoleic acid and linolenic acid, respectively, in the pre-processed oil from which the processed oil was produced.

In another aspect of the fifth embodiment or any of the foregoing aspects of the fifth embodiment, wherein the amount of oleic acid, linoleic acid and linolenic acid in the processed oil is within about 1% of the amount of oleic acid, linoleic acid and linolenic acid, respectively, in the pre-processed oil from which the processed oil was produced.

In another aspect of the fifth embodiment or any of the foregoing aspects of the fifth embodiment, wherein the processed oil comprises three times the amount of MAGs relative to the amount of TAGs in the pre-processed oil from which the processed oil was produced.

In another aspect of the fifth embodiment or any of the foregoing aspects of the fifth embodiment, wherein the processed oil comprises oleic acid in the form of oleic acid monoglyceride in an amount that is about the same as the amount of oleic acid in the pre-processed oil from which the processed oil was produced.

In a sixth embodiment, a processed oil has a fatty acid profile comprising oleic acid, linoleic acid and linolenic acid, wherein the amount of oleic acid, linoleic acid and linolenic acid in the processed oil is within about 10% of the amount of oleic acid, linoleic acid and linolenic acid, respectively, in the pre-processed oil from which the processed oil was produced, and wherein the processed oil comprises greater than 50% by weight monoacylglyceride (MAGs) based on the total weight of the processed oil.

In a seventh embodiment, a processed oil has a fatty acid profile comprising oleic acid, linoleic acid and linolenic acid, wherein the amount of oleic acid, linoleic acid and linolenic acid in the processed oil is within about 1% of the amount of oleic acid, linoleic acid and linolenic acid, respectively, in the pre-processed oil from which the processed oil was produced, and wherein the processed oil comprises greater than 50% by weight monoacylglyceride (MAGs) based on the total weight of the processed oil.

In an eighth embodiment, a processed oil comprises oleic acid and linoleic acid, wherein a ratio of oleic acid to linoleic acid in the processed oil is between about 0.01 and about 5, and wherein the processed oil comprises greater than 50% by weight monoacylglyceride (MAGs) based on the total weight of the processed oil.

In an aspect of the eighth embodiment, the ratio of oleic acid to linoleic acid in the processed oil is between about 1 and about 4.

In another aspect of the eighth embodiment, the ratio of oleic acid to linoleic acid in the processed oil is between about 3 and about 4.

In another aspect of the eighth embodiment or any of the foregoing aspects of the eighth embodiment, the processed oil further comprises linoleic acid, wherein a ratio of oleic acid to linolenic acid in the processed oil is between about 1 and about 100.

In another aspect of the eighth embodiment or any of the foregoing aspects of the eighth embodiment, the processed oil further comprises linoleic acid, wherein a ratio of oleic acid to linolenic acid in the processed oil is between about 10 and about 100.

In another aspect of the eighth embodiment or any of the foregoing aspects of the eighth embodiment, the processed oil further comprises linoleic acid, wherein a ratio of oleic acid to linolenic acid in the processed oil is between about 10 and about 30.

In a ninth embodiment, a processed oil comprises oleic acid and linolenic acid, wherein a ratio of oleic acid to linolenic acid in the processed oil is between about 1 and about 100, and wherein the processed oil comprises greater than 50% by weight monoacylglyceride (MAGs) based on the total weight of the processed oil.

In a tenth embodiment, a processed oil comprises oleic acid and linolenic acid, wherein a ratio of oleic acid to linolenic acid in the processed oil is between about 10 and about 100, and wherein the processed oil comprises greater than 50% by weight monoacylglyceride (MAGs) based on the total weight of the processed oil.

In an eleventh embodiment, a processed oil comprises oleic acid and linolenic acid, wherein a ratio of oleic acid to linolenic acid in the processed oil is between about 10 and about 30, and wherein the processed oil comprises greater than 50% by weight monoacylglyceride (MAGs) based on the total weight of the processed oil.

In an aspect of the ninth, tenth or eleventh embodiments, the processed oil further comprises linoleic acid, wherein a ratio of oleic acid to linoleic acid in the processed oil is between about 0.01 and about 5.

In an aspect of the ninth, tenth or eleventh embodiments, the processed oil further comprises linoleic acid, wherein a ratio of oleic acid to linoleic acid in the processed oil is between about 1 and about 4.

In an aspect of the ninth, tenth or eleventh embodiments, the processed oil further comprises linoleic acid, wherein a ratio of oleic acid to linoleic acid in the processed oil is between about 3 and about 4.

In an aspect of the eighth, ninth, tenth or eleventh embodiments and any of the foregoing aspects of the eighth, ninth, tenth or eleventh embodiments, at least a portion of said oleic acid is present in the form of oleic acid monoglyceride (MOG).

In an aspect of the eighth, ninth, tenth or eleventh embodiments and any of the foregoing aspects of the eighth, ninth, tenth or eleventh embodiments, at least a portion of said oleic acid is present in the form of oleic acid monoglyceride (MOG), and at least 50% by weight 1-oleyl monoglyceride out of the total amount of MOG.

In an aspect of the eighth, ninth, tenth or eleventh embodiments and any of the foregoing aspects of the eighth, ninth, tenth or eleventh embodiments, at least a portion of said oleic acid is present in the form of oleic acid monoglyceride (MOG), and at least 60% by weight 1-oleyl monoglyceride out of the total amount of MOG.

In an aspect of the eighth, ninth, tenth or eleventh embodiments and any of the foregoing aspects of the eighth, ninth, tenth or eleventh embodiments, at least a portion of said oleic acid is present in the form of oleic acid monoglyceride (MOG), and at least 70% by weight 1-oleyl monoglyceride out of the total amount of MOG.

In an aspect of the eighth, ninth, tenth or eleventh embodiments and any of the foregoing aspects of the eighth, ninth, tenth or eleventh embodiments, at least a portion of said oleic acid is present in the form of oleic acid monoglyceride (MOG), and at least 80% by weight 1-oleyl monoglyceride out of the total amount of MOG.

In an aspect of the eighth, ninth, tenth or eleventh embodiments and any of the foregoing aspects of the eighth, ninth, tenth or eleventh embodiments, the processed oil comprises less than 10% by weight triacylglycerides (TAGs) based on the total weight of the processed oil.

In an aspect of the eighth, ninth, tenth or eleventh embodiments and any of the foregoing aspects of the eighth, ninth, tenth or eleventh embodiments, the processed oil comprises greater than 50% by weight monoacylglyceride (MAGs) based on the total weight of the processed oil.

In an aspect of the eighth, ninth, tenth or eleventh embodiments and any of the foregoing aspects of the eighth, ninth, tenth or eleventh embodiments, the processed oil comprises greater than 60% by weight monoacylglyceride (MAGs) based on the total weight of the processed oil.

In an aspect of the eighth, ninth, tenth or eleventh embodiments and any of the foregoing aspects of the eighth, ninth, tenth or eleventh embodiments, the processed oil comprises greater than 70% by weight monoacylglyceride (MAGs) based on the total weight of the processed oil.

In an aspect of the eighth, ninth, tenth or eleventh embodiments and any of the foregoing aspects of the eighth, ninth, tenth or eleventh embodiments, the processed oil comprises greater than 80% by weight monoacylglyceride (MAGs) based on the total weight of the processed oil.

In an aspect of the eighth, ninth, tenth or eleventh embodiments and any of the foregoing aspects of the eighth, ninth, tenth or eleventh embodiments, the processed oil comprises greater than 90% by weight monoacylglyceride (MAGs) based on the total weight of the processed oil.

In an aspect of the eighth, ninth, tenth or eleventh embodiments and any of the foregoing aspects of the eighth, ninth, tenth or eleventh embodiments, the processed oil is derived from an oil source.

In an aspect of the preceding aspect, the processed oil comprises non-oil ingredients derived from and naturally present in the oil source such that the non-oil ingredients are not added to the processed oil.

In an aspect of the preceding aspect, the non-oil ingredients are selected from antioxidants, vitamins, and mixtures thereof.

In an aspect of the preceding aspect, said antioxidant is tocopherol.

In an aspect of the preceding aspect, said tocopherol is selected from α-tocopherol, β-tocopherol, δ-tocopherol, γ-tocopherol, α-tocotrienol, β-tocotrienol, δ-tocotrienol, and γ-tocotrienol.

In an aspect of the eighth, ninth, tenth or eleventh embodiments and any of the foregoing aspects of the eighth, ninth, tenth or eleventh embodiments, the processed oil is substantially free of monochloropropandiol (MCPD).

In an aspect of the eighth, ninth, tenth or eleventh embodiments and any of the foregoing aspects of the eighth, ninth, tenth or eleventh embodiments, the processed oil has less than 0.10 mg/kg monochloropropandiol (MCPD).

In an aspect of the eighth, ninth, tenth or eleventh embodiments and any of the foregoing aspects of the eighth, ninth, tenth or eleventh embodiments, the oil source is from an origin selected from a plant, an animal, algae or fish.

In an aspect of the preceding aspect, said oil source is of plant origin.

In an aspect of the preceding aspect, said oil source is selected from the group consisting of safflower oil, grape oil, *Silybum marianum* oil, hemp oil, sunflower oil, wheat germ oil, pumpkin seed oil, sesame oil, rice bran oil, almond oil, rapeseed oil, peanut oil, olive oil, and coconut oil.

In an aspect of the eighth, ninth, tenth or eleventh embodiments and any of the foregoing aspects of the eighth, ninth, tenth or eleventh embodiments, said processed oil comprises a MAG content of from about 50% to about 95% by weight based on the total weight of the processed oil.

In an aspect of the eighth, ninth, tenth or eleventh embodiments and any of the foregoing aspects of the eighth, ninth, tenth or eleventh embodiments, said processed oil comprises a TAG content from about 5% to about 0.5% by weight based on the total weight of the processed oil.

In an aspect of the eighth, ninth, tenth or eleventh embodiments and any of the foregoing aspects of the eighth, ninth, tenth or eleventh embodiments, said processed oil has a fatty acid profile that is substantially the same as a fatty acid profile of the pre-processed oil from which the processed oil was produced.

In an aspect of the preceding aspect, said fatty acid profile comprises oleic acid, linoleic acid and linolenic acid In an aspect of the eighth, ninth, tenth or eleventh embodiments and any of the foregoing aspects of the eighth, ninth, tenth or eleventh embodiments, the amount of oleic acid, linoleic acid and linolenic acid in the processed oil is within about 10% of the amount of oleic acid, linoleic acid and linolenic acid, respectively, in the pre-processed oil from which the processed oil was produced.

In an aspect of the eighth, ninth, tenth or eleventh embodiments and any of the foregoing aspects of the eighth, ninth, tenth or eleventh embodiments, the amount of oleic acid, linoleic acid and linolenic acid in the processed oil is within about 1% of the amount of oleic acid, linoleic acid and linolenic acid, respectively, in the pre-processed oil from which the processed oil was produced.

In an aspect of the eighth, ninth, tenth or eleventh embodiments and any of the foregoing aspects of the eighth, ninth, tenth or eleventh embodiments, the processed oil comprises three times the amount of MAGs relative to the amount of TAGs in the pre-processed oil from which the processed oil was produced.

In an aspect of the eighth, ninth, tenth or eleventh embodiments and any of the foregoing aspects of the eighth, ninth, tenth or eleventh embodiments, the processed oil comprises oleic acid in the form of oleic acid monoglyceride in an amount that is about the same as the amount of oleic acid in the pre-processed oil from which the processed oil was produced.

In a twelfth embodiment, a processed oil comprises oleic acid and linoleic acid and having a total fatty acid content, wherein said linoleic acid is present in an amount from about 10% to about 90% by weight out of the total fatty acid content of the processed oil, and wherein the processed oil comprises greater than 50% by weight monoacylglyceride (MAGs) based on the total weight of the processed oil.

In an aspect of the twelfth embodiment, said linoleic acid is present in an amount from about 20% to about 90% by weight out of the total fatty acid content of the processed oil.

In another aspect of the twelfth embodiment, said linoleic acid is present in an amount from about 10% to about 25% by weight out of the total fatty acid content of the processed oil.

In an aspect of the twelfth embodiment or any of the foregoing aspects of the twelfth embodiment, the processed oil further comprises linolenic acid, wherein said linolenic acid is present in an amount from about 0.01% to about 2% by weight out of the total fatty acid content of the processed oil.

In an aspect of the twelfth embodiment or any of the foregoing aspects of the twelfth embodiment, a ratio of oleic acid to linoleic acid in the processed oil is between about 0.01 and about 5.

In an aspect of the twelfth embodiment or any of the foregoing aspects of the twelfth embodiment, a ratio of oleic acid to linoleic acid in the processed oil is between about 1 and about 4.

In an aspect of the twelfth embodiment or any of the foregoing aspects of the twelfth embodiment, a ratio of oleic acid to linoleic acid in the processed oil is between about 3 and about 4.

In an aspect of the twelfth embodiment or any of the foregoing aspects of the twelfth embodiment, a ratio of oleic acid to linolenic acid in the processed oil is between about 1 and about 100.

In an aspect of the twelfth embodiment or any of the foregoing aspects of the twelfth embodiment, a ratio of oleic acid to linolenic acid in the processed oil is between about 10 and about 100.

In an aspect of the twelfth embodiment or any of the foregoing aspects of the twelfth embodiment, a ratio of oleic acid to linolenic acid in the processed oil is between about 10 and about 30.

In an aspect of the twelfth embodiment or any of the foregoing aspects of the twelfth embodiment, wherein at least a portion of said oleic acid is present in the form of oleic acid monoglyceride (MOG).

In an aspect of the twelfth embodiment or any of the foregoing aspects of the twelfth embodiment, the MOG in the processed oil comprises at least 50% by weight 1-oleyl monoglyceride out of the total amount of MOG.

In an aspect of the twelfth embodiment or any of the foregoing aspects of the twelfth embodiment, the MOG in the processed oil comprises at least 60% by weight 1-oleyl monoglyceride out of the total amount of MOG.

In an aspect of the twelfth embodiment or any of the foregoing aspects of the twelfth embodiment, the MOG in the processed oil comprises at least 70% by weight 1-oleyl monoglyceride out of the total amount of MOG.

In an aspect of the twelfth embodiment or any of the foregoing aspects of the twelfth embodiment, the MOG in the processed oil comprises at least 80% by weight 1-oleyl monoglyceride out of the total amount of MOG.

In an aspect of the twelfth embodiment or any of the foregoing aspects of the twelfth embodiment, the processed oil comprises less than 10% by weight triacylglycerides (TAGs) based on the total weight of the processed oil.

In an aspect of the twelfth embodiment or any of the foregoing aspects of the twelfth embodiment, the processed oil comprises greater than 50% by weight monoacylglyceride (MAGs) based on the total weight of the processed oil.

In an aspect of the twelfth embodiment or any of the foregoing aspects of the twelfth embodiment, the processed oil comprises greater than 60% by weight monoacylglyceride (MAGs) based on the total weight of the processed oil.

In an aspect of the twelfth embodiment or any of the foregoing aspects of the twelfth embodiment, the processed oil comprises greater than 70% by weight monoacylglyceride (MAGs) based on the total weight of the processed oil.

In an aspect of the twelfth embodiment or any of the foregoing aspects of the twelfth embodiment, the processed oil comprises greater than 80% by weight monoacylglyceride (MAGs) based on the total weight of the processed oil.

In an aspect of the twelfth embodiment or any of the foregoing aspects of the twelfth embodiment, the processed oil comprises greater than 90% by weight monoacylglyceride (MAGs) based on the total weight of the processed oil.

In an aspect of the twelfth embodiment or any of the foregoing aspects of the twelfth embodiment, the processed oil is processed oil derived from an oil source.

In an aspect of the preceding aspect, the processed oil comprises non-oil ingredients derived from and naturally present in the oil source such that the non-oil ingredients are not added to the processed oil.

In an aspect of the preceding aspect, the non-oil ingredients are selected from antioxidants, vitamins, and mixtures thereof.

In an aspect of the preceding aspect, said antioxidant is tocopherol.

In an aspect of the preceding aspect, said tocopherol is selected from α-tocopherol, β-tocopherol, δ-tocopherol, γ-tocopherol, α-tocotrienol, β-tocotrienol, δ-tocotrienol, and γ-tocotrienol.

In an aspect of the twelfth embodiment or any of the foregoing aspects of the twelfth embodiment, the processed oil is substantially free of monochloropropandiol (MCPD).

In an aspect of the twelfth embodiment or any of the foregoing aspects of the twelfth embodiment, the processed oil has less than 0.10 mg/kg monochloropropandiol (MCPD).

In an aspect of the twelfth embodiment or any of the foregoing aspects of the twelfth embodiment, said oil source is from an origin selected from a plant, an animal, algae or fish.

In an aspect of the preceding aspect, the oil source is of plant origin.

In an aspect of the preceding aspect, said oil source is selected from the group consisting of safflower oil, grape oil, *Silybum marianum* oil, hemp oil, sunflower oil, wheat germ oil, pumpkin seed oil, sesame oil, rice bran oil, almond oil, rapeseed oil, peanut oil, olive oil, and coconut oil.

In an aspect of the twelfth embodiment or any of the foregoing aspects of the twelfth embodiment, said processed oil comprises a MAG content of from about 50% to about 95% by weight based on the total weight of the processed oil.

In an aspect of the twelfth embodiment or any of the foregoing aspects of the twelfth embodiment, said processed oil comprises a TAG content from about 5% to about 0.5% by weight based on the total weight of the processed oil.

In an aspect of the twelfth embodiment or any of the foregoing aspects of the twelfth embodiment, said processed oil has a fatty acid profile that is substantially the same as a fatty acid profile of the pre-processed oil from which the processed oil was produced.

In an aspect of the preceding aspect, said fatty acid profile comprises oleic acid, linoleic acid and linolenic acid.

In an aspect of the twelfth embodiment or any of the foregoing aspects of the twelfth embodiment, the amount of oleic acid, linoleic acid and linolenic acid in the processed oil is within about 10% of the amount of oleic acid, linoleic acid and linolenic acid, respectively, in the pre-processed oil from which the processed oil was produced.

In an aspect of the twelfth embodiment or any of the foregoing aspects of the twelfth embodiment, the amount of oleic acid, linoleic acid and linolenic acid in the processed oil is within about 1% of the amount of oleic acid, linoleic acid and linolenic acid, respectively, in the pre-processed oil from which the processed oil was produced.

In an aspect of the twelfth embodiment or any of the foregoing aspects of the twelfth embodiment, the processed oil comprises about the same amount of MAGs relative to the amount of TAGs in the pre-processed oil from which the processed oil was produced.

In an aspect of the twelfth embodiment or any of the foregoing aspects of the twelfth embodiment, the processed oil comprises oleic acid in the form of oleic acid monoglyceride in an amount that is about the same as the amount of oleic acid in the pre-processed oil from which the processed oil was produced.

In a thirteenth embodiment, a processed oil has a fatty acid profile comprising oleic acid, linoleic acid and linolenic acid, wherein the amount of oleic acid, linoleic acid and linolenic acid in the processed oil is within about 10% of the amount of oleic acid, linoleic acid and linolenic acid, respectively, in the pre-processed oil from which the processed oil was produced, and wherein the processed oil comprises greater than 50% by weight monoacylglyceride (MAGs) based on the total weight of the processed oil.

In a fourteenth embodiment, a processed oil has a fatty acid profile comprising oleic acid, linoleic acid and linolenic acid, wherein the amount of oleic acid, linoleic acid and linoleic acid in the processed oil is within about 1% of the amount of oleic acid, linoleic acid and linolenic acid, respectively, in the pre-processed oil from which the processed oil was produced, and wherein the processed oil comprises greater than 50% by weight monoacylglyceride (MAGs) based on the total weight of the processed oil.

In a fifteenth embodiment, a method for promoting glucose homeostasis in a subject in need thereof, comprises: administering to said subject a composition comprising a processed oil.

In a sixteenth embodiment, a method for treating type II diabetes in a subject in need thereof, comprises: administering to said subject a composition comprising a processed oil.

In a seventeenth embodiment, a method for promoting glucose homeostasis in a subject in need thereof, comprises: administering to said subject a composition comprising a processed oil comprising oleic acid monoglyceride (MOG), wherein at least 50% by weight of said MOG is 1-oleyl monoglyceride.

In an eighteenth embodiment, a method for treating diabetes in a subject in need thereof, comprises: administering to said subject a composition comprising a processed oil comprising oleic acid monoglyceride (MOG), wherein at least 50% by weight of said MOG is 1-oleyl monoglyceride.

In an aspect of the seventeenth or eighteenth embodiment, at least 60% by weight of said MOG is 1-oleyl monoglyceride.

In another aspect of the seventeenth or eighteenth embodiment, at least 70% by weight of said MOG is 1-oleyl monoglyceride.

In another aspect of the seventeenth or eighteenth embodiment, at least 80% by weight of said MOG is 1-oleyl monoglyceride.

In an aspect of the fifteenth, sixteenth, seventeenth or eighteenth embodiment or any of the foregoing aspects of the seventeenth or eighteenth embodiment, said processed oil is a processed oil according to any one of the fifth through fourteenth embodiments and any of the foregoing aspects thereof.

In an aspect of the fifteenth, sixteenth, seventeenth or eighteenth embodiment or any of the foregoing aspects of the fifteenth, sixteenth, seventeenth or eighteenth embodiment, the composition is a food product comprising the processed oil of a food product of any of the first, second or third embodiment and any of the foregoing aspects thereof.

In an aspect of the fifteenth or seventeenth embodiment or any of the foregoing aspects of the fifteenth or seventeenth embodiment, said subject is suffering from a condition that affects glucose homeostasis.

In an aspect of the preceding aspect, the condition is insulin resistance or type II diabetes.

In an aspect of the fifth, sixth or seventh embodiment or any of the foregoing aspects of the fifth, sixth or seventh embodiment, said MOG contributes between about 10% and about 75% by weight of the total fatty acid content of the processed oil.

In an aspect of the fifth, sixth or seventh embodiment or any of the foregoing aspects of the fifth, sixth or seventh embodiment, said MOG contributes between about 20% and about 75% by weight of the total fatty acid content of the processed oil.

In an aspect of the fifth, sixth or seventh embodiment or any of the foregoing aspects of the fifth, sixth or seventh embodiment, said MOG contributes between about 30% and about 75% by weight of the total fatty acid content of the processed oil.

In an aspect of the fifth, sixth or seventh embodiment or any of the foregoing aspects of the fifth, sixth or seventh embodiment, said MOG contributes between about 40% and about 75% by weight of the total fatty acid content of the processed oil.

In an aspect of the fifth, sixth or seventh embodiment or any of the foregoing aspects of the fifth, sixth or seventh embodiment, said MOG contributes between about 50% and about 75% by weight of the total fatty acid content of the processed oil.

In an aspect of the fifth, sixth or seventh embodiment or any of the foregoing aspects of the fifth, sixth or seventh embodiment, said MOG contributes between about 60% and about 75% by weight of the total fatty acid content of the processed oil.

In an aspect of the eighth, ninth, tenth, eleventh, twelfth, thirteenth or fourteenth embodiment or any of the foregoing aspects of the eighth, ninth, tenth, eleventh, twelfth, thirteenth or fourteenth embodiment, said processed oil comprises oleic acid monoglyceride (MOG) in an amount that contributes 5% to about 75% by weight of the fatty acid content of the processed oil.

In an aspect of the eighth, ninth, tenth, eleventh, twelfth, thirteenth or fourteenth embodiment or any of the foregoing aspects of the eighth, ninth, tenth, eleventh, twelfth, thirteenth or fourteenth embodiment, said processed oil comprises oleic acid monoglyceride (MOG) in an amount that contributes between about 10% and about 75% by weight of the total fatty acid content of the processed oil.

In an aspect of the eighth, ninth, tenth, eleventh, twelfth, thirteenth or fourteenth embodiment or any of the foregoing aspects of the eighth, ninth, tenth, eleventh, twelfth, thirteenth or fourteenth embodiment, said processed oil comprises oleic acid monoglyceride (MOG) in an amount that contributes between about 20% and about 75% by weight of the total fatty acid content of the processed oil.

In an aspect of the eighth, ninth, tenth, eleventh, twelfth, thirteenth or fourteenth embodiment or any of the foregoing aspects of the eighth, ninth, tenth, eleventh, twelfth, thirteenth or fourteenth embodiment, said processed oil comprises oleic acid monoglyceride (MOG) in an amount that contributes between about 30% and about 75% by weight of the total fatty acid content of the processed oil.

In an aspect of the eighth, ninth, tenth, eleventh, twelfth, thirteenth or fourteenth embodiment or any of the foregoing aspects of the eighth, ninth, tenth, eleventh, twelfth, thirteenth or fourteenth embodiment, said processed oil comprises oleic acid monoglyceride (MOG) in an amount that contributes between about 40% and about 75% by weight of the total fatty acid content of the processed oil.

In an aspect of the eighth, ninth, tenth, eleventh, twelfth, thirteenth or fourteenth embodiment or any of the foregoing aspects of the eighth, ninth, tenth, eleventh, twelfth, thirteenth or fourteenth embodiment, said processed oil comprises oleic acid monoglyceride (MOG) in an amount that contributes between about 50% and about 75% by weight of the total fatty acid content of the processed oil.

In an aspect of the eighth, ninth, tenth, eleventh, twelfth, thirteenth or fourteenth embodiment or any of the foregoing aspects of the eighth, ninth, tenth, eleventh, twelfth, thirteenth or fourteenth embodiment, said processed oil comprises oleic acid monoglyceride (MOG) in an amount that contributes between about 60% and about 75% by weight of the total fatty acid content of the processed oil.

In a nineteenth embodiment, a processed oil has a fatty acid profile wherein the fatty acid profile of the processed oil is substantially the same as the pre-processed oil from which the processed oil was produced, and wherein the processed oil comprises greater than 50% by weight monoacylglyceride (MAGs) based on the total weight of the processed oil.

In a twentieth embodiment, a food product comprises the processed oil of any one of the fifth, sixth, seventh, eighth, ninth, tenth, eleventh, twelfth, thirteenth or fourteenth embodiment or any of the foregoing aspects of the fifth, sixth, seventh, eighth, ninth, tenth, eleventh, twelfth, thirteenth or fourteenth embodiments.

In a twenty-first embodiment, a processed oil comprises greater than 50% by weight monoacylglyceride (MAGs) based on the total weight of the processed oil and having a total fatty acid content.

In a twenty-second embodiment, a processed oil comprises greater than 60% by weight monoacylglyceride (MAGs) based on the total weight of the processed oil and having a total fatty acid content.

In a twenty-third embodiment, a processed oil comprises greater than 70% by weight monoacylglyceride (MAGs) based on the total weight of the processed oil and having a total fatty acid content.

In a twenty-fourth embodiment, a processed oil comprises greater than 80% by weight monoacylglyceride (MAGs) based on the total weight of the processed oil and having a total fatty acid content.

In a twenty-fifth embodiment, a processed oil comprises greater than 90% by weight monoacylglyceride (MAGs) based on the total weight of the processed oil and having a total fatty acid content.

In an aspect of the twenty-first, twenty-second, twenty-third, twenty-fourth or twenty-fifth embodiment, the processed oil further comprises oleic acid in amount of from about 5% to about 75% by weight out of the total fatty acid content of the processed oil.

In another aspect of the twenty-first, twenty-second, twenty-third, twenty-fourth or twenty-fifth embodiment, the processed oil further comprises oleic acid in amount of from about 10% to about 75% by weight out of the total fatty acid content of the processed oil.

In another aspect of the twenty-first, twenty-second, twenty-third, twenty-fourth or twenty-fifth embodiment, the processed oil further comprises oleic acid in amount of from about 20% to about 75% by weight out of the total fatty acid content of the processed oil.

In another aspect of the twenty-first, twenty-second, twenty-third, twenty-fourth or twenty-fifth embodiment, the processed oil further comprises oleic acid in amount of from about 30% to about 75% by weight out of the total fatty acid content of the processed oil.

In another aspect of the twenty-first, twenty-second, twenty-third, twenty-fourth or twenty-fifth embodiment, the processed oil further comprises oleic acid in amount of from about 40% to about 75% by weight out of the total fatty acid content of the processed oil.

In another aspect of the twenty-first, twenty-second, twenty-third, twenty-fourth or twenty-fifth embodiment, the processed oil further comprises oleic acid in amount of from about 50% to about 75% by weight out of the total fatty acid content of the processed oil.

In another aspect of the twenty-first, twenty-second, twenty-third, twenty-fourth or twenty-fifth embodiment, the processed oil further comprises oleic acid in amount of from about 60% to about 75% by weight out of the total fatty acid content of the processed oil.

In an aspect of the twenty-first, twenty-second, twenty-third, twenty-fourth or twenty-fifth embodiment or any of the foregoing aspects of the twenty-first, twenty-second, twenty-third, twenty-fourth or twenty-fifth embodiment, the processed oil further comprises linoleic acid in an amount of from about 1.5% to about 90% by weight out of the total fatty acid content of the processed oil.

In an aspect of the twenty-first, twenty-second, twenty-third, twenty-fourth or twenty-fifth embodiment or any of the foregoing aspects of the twenty-first, twenty-second, twenty-third, twenty-fourth or twenty-fifth embodiment, the processed oil further comprises linoleic acid in an amount of from about 10% to about 25% by weight out of the total fatty acid content of the processed oil.

In an aspect of the twenty-first, twenty-second, twenty-third, twenty-fourth or twenty-fifth embodiment or any of the foregoing aspects of the twenty-first, twenty-second, twenty-third, twenty-fourth or twenty-fifth embodiment, the processed oil further comprises linolenic acid in an amount of from about 0.1% to about 2% by weight out of the total fatty acid content of the processed oil.

In another aspect of the twenty-first, twenty-second, twenty-third, twenty-fourth or twenty-fifth embodiment, the processed oil further comprises oleic acid and linoleic acid, wherein a ratio of oleic acid to linoleic acid is between about 0.01 and 5.

In another aspect of the twenty-first, twenty-second, twenty-third, twenty-fourth or twenty-fifth embodiment, the processed oil further comprises oleic acid and linoleic acid, wherein a ratio of oleic acid to linoleic acid is between about 1 and 4.

In another aspect of the twenty-first, twenty-second, twenty-third, twenty-fourth or twenty-fifth embodiment, the processed oil further comprises oleic acid and linoleic acid, wherein a ratio of oleic acid to linoleic acid is between about 3 and 4.

In another aspect of the twenty-first, twenty-second, twenty-third, twenty-fourth or twenty-fifth embodiment, the processed oil further comprises oleic acid and linolenic acid, wherein a ratio of oleic acid to linolenic acid is between about 1 and 100.

In another aspect of the twenty-first, twenty-second, twenty-third, twenty-fourth or twenty-fifth embodiment, the processed oil further comprises oleic acid and linolenic acid, wherein a ratio of oleic acid to linolenic acid is between about 10 and 100.

In another aspect of the twenty-first, twenty-second, twenty-third, twenty-fourth or twenty-fifth embodiment, the processed oil further comprises oleic acid and linolenic acid, wherein a ratio of oleic acid to linolenic acid is between about 10 and 30.

The foregoing description of specific embodiments of the present disclosure has been presented for purpose of illustration and description. The exemplary embodiments were chosen and described in order to best explain the principles of the disclosure and its practical application, to thereby enable others skilled in the art to best utilize the subject matter and various embodiments with various modifications are suited to the particular use contemplated. Different features and disclosures of the various embodiments within the present disclosure may be combined within the scope of the present disclosure.

What is claimed is:

1. A method for making a monoacylglycerol-enriched oil, comprising:

mixing a starting oil comprising triacylglycerols (TAGs), wherein the TAGs are in an amount greater than 50% by weight based on total weight of the starting oil, and wherein the starting oil is either free of monoacylglycerols (MAGs) or are present in an amount less than 5% by weight based on the total weight of the starting oil, a buffer solution and a first enzyme capable of hydrolyzing said TAGs to free fatty acids (FFAs) to yield a first reaction mixture;

allowing said first reaction mixture to react under conditions sufficient for said first enzyme to hydrolyze said TAGs for a first period of time to yield an aqueous phase and a first lipid reaction product comprising FFAs;

inactivating said first enzyme in said first lipid reaction product;

collecting said first lipid reaction product by removing said first lipid reaction product from the aqueous phase;

mixing said first lipid reaction product with a food-grade glycerol and a second enzyme capable of esterifying the FFAs to form a second reaction mixture;

allowing said second reaction mixture to react for a second period of time to yield a second lipid reaction product comprising a lipid oil phase and a glycerol phase, wherein water is removed from the second reaction mixture during the second period of time;

inactivating said second enzyme in said second lipid reaction product;

adding salt to the second lipid reaction product and separating the lipid oil phase from said glycerol phase; and collecting said lipid oil phase, wherein the lipid oil phase comprises MAGs, diacylglycerols (DAGs), and free fatty acids (FFAs), wherein the MAGs are in an amount from about 30% to about 90% by weight based on total weight of the lipid oil phase, wherein the DAGs constitute from about 10% to about 30% by weight of the total weight of the lipid oil phase, wherein the FFAs constitutes from about 5% to about 60% by weight of the total weight of the lipid oil phase, and wherein the lipid oil phase either is free of TAGs or comprises TAGs in an about from about 0.1% to about 5% by weight based on the total weight of the lipid oil phase.

2. The method of claim 1, wherein the starting oil is from about 1.00 mg/kg to about 12.00 mg/kg of monochloropropandiol (MCPD), wherein the lipid oil phase is substantially free of MCPD.

3. The method of claim 1, wherein said starting oil is an oil derived from plant, animal or fish origin.

4. The method of claim 1, wherein said starting oil is a plant oil selected from the group consisting of olive oil, sunflower oil, corn oil, almond oil, rapeseed oil, palm oil, soybean oil, flaxseed oil, and mixtures thereof.

5. The method of claim 1, wherein said first enzyme is a lipase.

6. The method of claim 1, wherein said buffer solution is a sodium citrate solution.

7. The method of claim 1, wherein said first period of time is between about 14 and about 24 hours.

8. The method of claim 1, wherein allowing said first reaction mixture to react under conditions sufficient for said first enzyme to hydrolyze said TAGs is performed at a temperature between about 30° C. and about 35° C.

9. The method of claim 1, wherein said second enzyme is a lipase.

10. The method of claim 1, wherein the first and second enzymes are each lipases, but different lipases.

11. The method of claim 1, wherein said second period of time is between about 24 hours and about 72 hours.

12. The method of claim 1, wherein allowing said second reaction mixture to react for the second period of time to yield the lipid oil phase and the glycerol phase is performed at a temperature between about 17° C. and 23° C.

13. The method of claim 1, wherein the inactivating of said second enzyme is performed by heating said second lipid reaction product.

14. The method of claim 13, wherein said heating is performed at a temperature of at least 70° C. for at least 1 hour.

* * * * *